United States Patent
Zhang et al.

(10) Patent No.: US 6,633,359 B1
(45) Date of Patent: Oct. 14, 2003

(54) LIQUID CRYSTAL DISPLAY HAVING SIGNAL LINES ON SUBSTRATE INTERMITTENTLY EXTENDING AND ITS MANUFACTURE

(75) Inventors: Hongyong Zhang, Kawasaki (JP); Takatoshi Mayama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 95 days.

(21) Appl. No.: 09/616,414

(22) Filed: Jul. 14, 2000

(30) Foreign Application Priority Data

Aug. 5, 1999 (JP) .......................... 11-222730

(51) Int. Cl.$^7$ .......................... G02F 1/1343
(52) U.S. Cl. .......................... 349/141; 349/38; 349/39; 349/139; 349/140
(58) Field of Search .......................... 349/38, 39, 139, 349/140, 141

(56) References Cited

U.S. PATENT DOCUMENTS

| | | | | |
|---|---|---|---|---|
| 5,056,895 A | * | 10/1991 | Kahn | 359/87 |
| 5,075,674 A | | 12/1991 | Katayama et al. | 340/719 |
| 5,508,532 A | * | 4/1996 | Teramoto | 257/59 |
| 5,604,358 A | * | 2/1997 | Kim | 257/59 |
| 5,790,222 A | * | 8/1998 | Kim | 349/139 |
| 5,861,635 A | * | 1/1999 | Song | 257/59 |
| 5,920,083 A | * | 7/1999 | Bae | 257/59 |
| 5,929,463 A | * | 7/1999 | Stupp et al. | 257/59 |
| 5,929,947 A | * | 7/1999 | Tani | 349/42 |
| 5,936,685 A | * | 8/1999 | Ito et al. | 349/38 |
| 6,055,028 A | * | 4/2000 | Nishi et al. | 349/33 |
| 6,084,562 A | * | 7/2000 | Onda | 345/94 |
| 6,118,508 A | * | 9/2000 | Park | 349/141 |
| 6,256,079 B1 | * | 7/2001 | Matsushima | 349/106 |
| 6,281,957 B1 | * | 8/2001 | Oh et al. | 349/141 |
| 6,429,909 B1 | * | 8/2002 | Kim et al. | 349/54 |

* cited by examiner

*Primary Examiner*—Robert H. Kim
*Assistant Examiner*—Andrew Schechter
(74) *Attorney, Agent, or Firm*—Greer, Burns & Crain, Ltd.

(57) ABSTRACT

An active matrix type liquid crystal display capable of displaying an image of high quality and brightness. The liquid crystal display has: a first substrate; a plurality of island-shaped TFT polysilicon layers disposed on the first substrate in a matrix shape; a gate insulating film formed on the first substrate; a plurality of scan lines formed on the gate insulating film and extending in a row direction; a plurality of first signal lines formed on the gate insulating film and intermittently extending in a column direction in an area excepting a cross area with the scan line and an area near the cross area; an interlayer insulating film formed over the gate insulating film; a plurality of first openings formed through the interlayer insulating film, the first openings exposing the first signal lines; and a plurality of second signal lines formed on the interlayer insulating film, the second signal lines being connected via the first openings to the first signal lines to form signal lines continuous in the column direction.

13 Claims, 22 Drawing Sheets

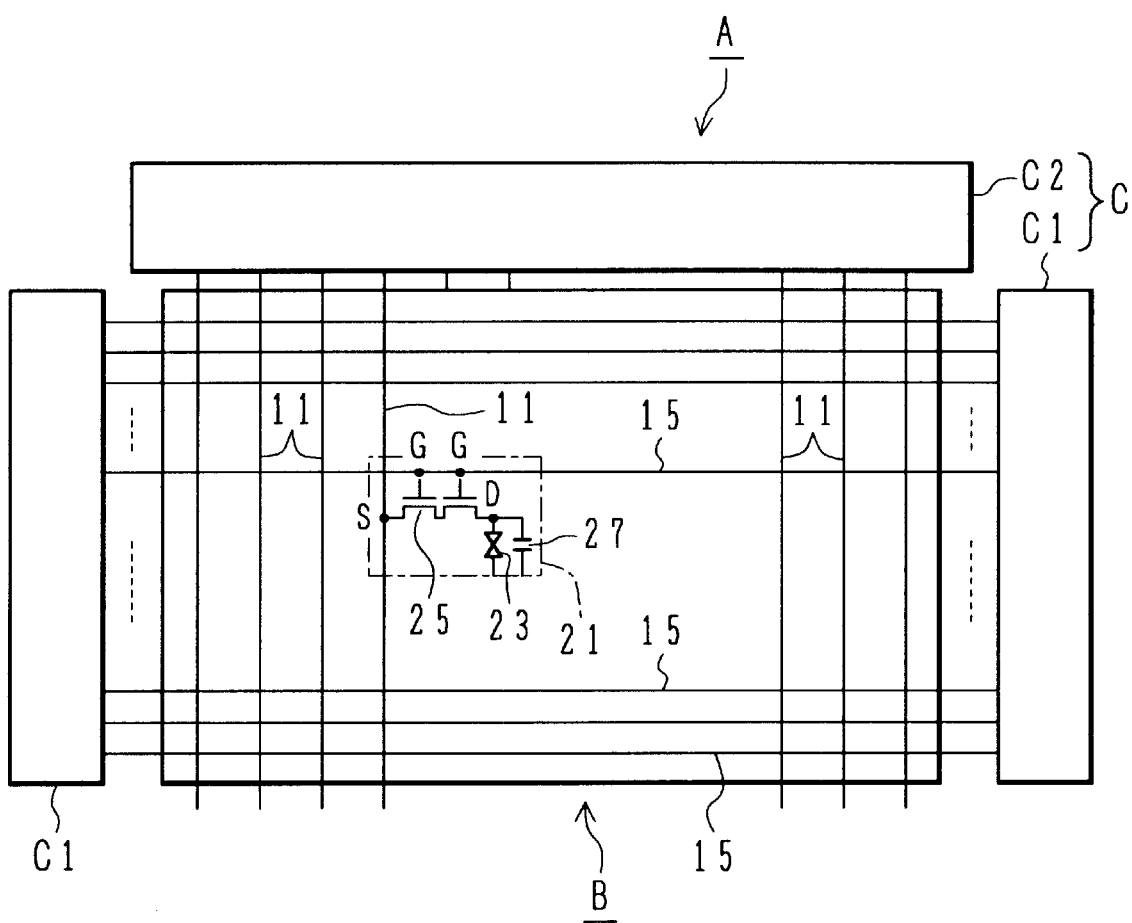

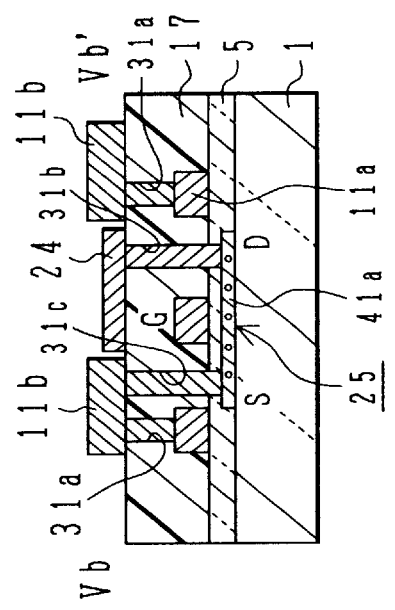
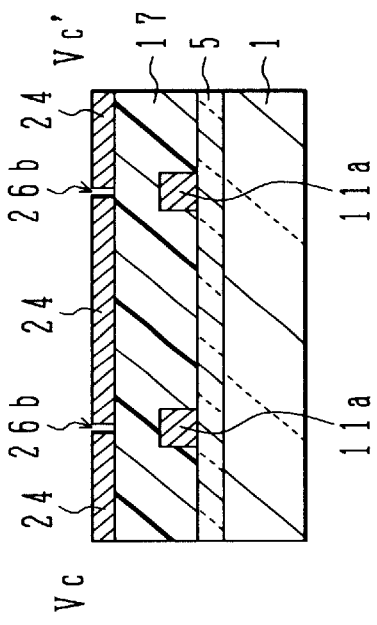
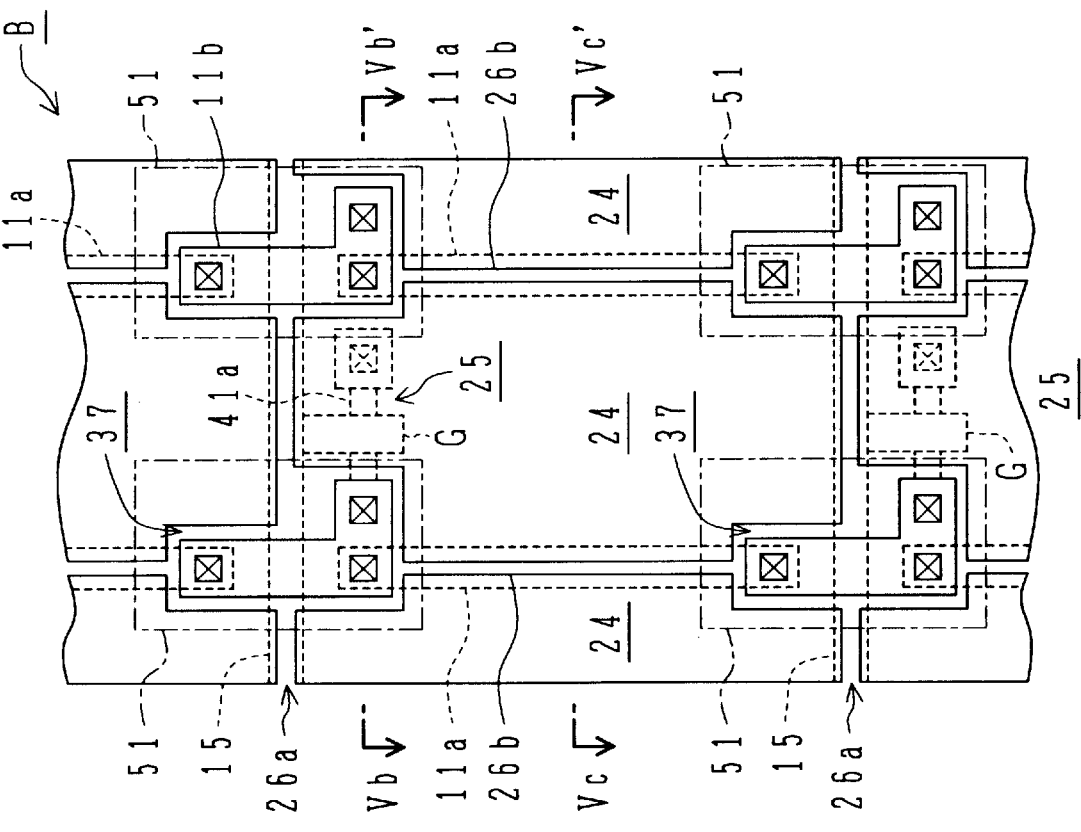

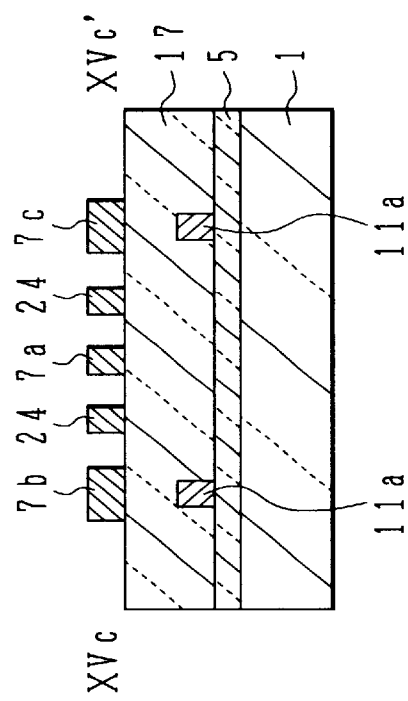
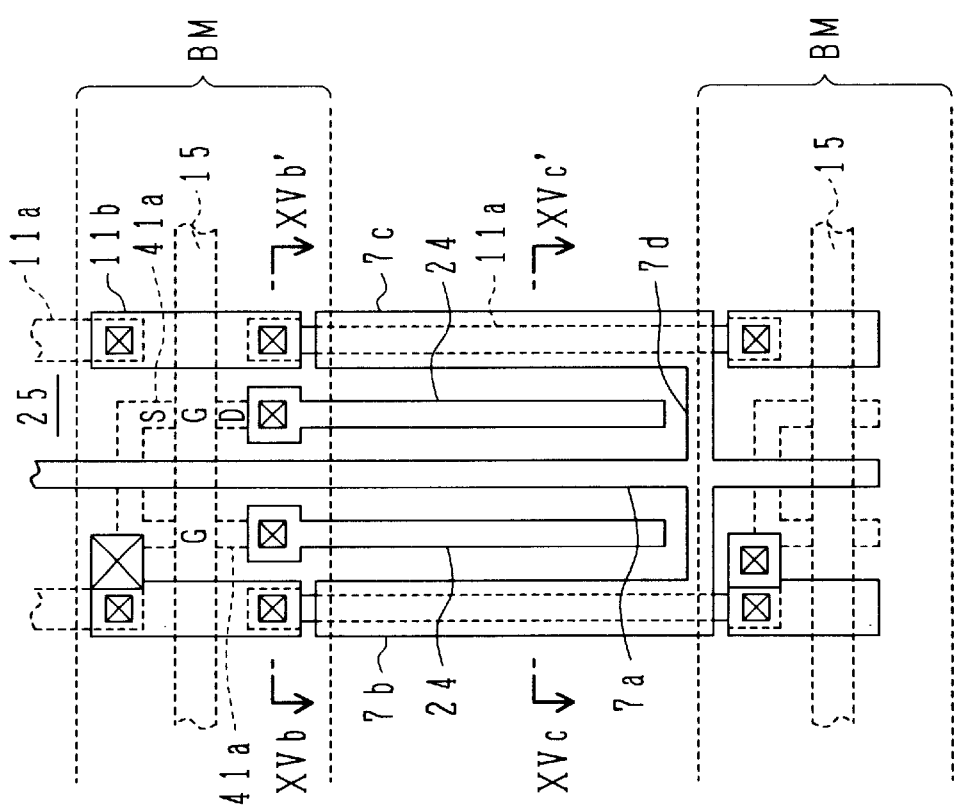
FIG.13B
FIG.13C
FIG.13A

LIQUID CRYSTAL DISPLAY HAVING SIGNAL LINES ON SUBSTRATE INTERMITTENTLY EXTENDING AND ITS MANUFACTURE

This application is based on Japanese Patent Application HEI 11-222730, filed on Aug. 5, 1999, all the contents of which are incorporated herein by reference.

BACKGROUND OF THE INVENTION a) Field of the Invention

The present invention relates to a liquid crystal display and its manufacture method, and more particularly to an active matrix type liquid crystal display having a semiconductor active element such as a thin film transistor (TFT) for each pixel as a switching element.

b) Description of the Related Art

An active matrix type liquid crystal display has a plurality of scan lines extending in a row direction and a plurality of signal lines extending in a column direction. A pixel is disposed at each cross point of a matrix. Each pixel has a pixel electrode and a switching element connected to the pixel electrode. In the active matrix type liquid crystal display, pixel data is turned on and off by a switching element. Liquid crystal is used as display media.

As switching elements, a metal-insulator-metal (MIM) element and a three-electrode element, particularly a field effect thin film transistor having a gate, a source and a drain are used.

In this embodiment, a TFT connected to a pixel electrode is called a pixel TFT or simply TFT. A current terminal of the pixel TFT is called a drain, and a current terminal of TFT connected to the signal lines is called a source. A unit cell including a pixel electrode and TFT is called a pixel. An image is formed on a display area having a number of pixels disposed in a matrix shape.

A scan line disposed in the row direction is connected to the gate electrodes of TFTs of each row. A signal line disposed in the column direction is connected to the source electrodes of TFTs of each column.

A circuit for driving the scan lines is called a scan line driver, and a circuit for driving the signal lines is called a signal line driver. A circuit for driving a display area including the scan line driver and signal line driver is called a peripheral circuit.

An active matrix type liquid crystal display using as a switching element a TFT at each pixel electrode is more suitable for multiple pixels and provides a clearer image than a simple matrix type liquid crystal display having cross electrodes formed on a pair of substrates.

Most displays of personal computers, video camera view finders and the like use active matrix type liquid crystal displays.

In a conventional active matrix type liquid crystal display, signal lines and pixel electrodes (usually, transparent electrodes made of, for example, indium tin oxide (ITO)) are formed at the same layer level (usually on an interlayer insulating film), and a shading area called a black matrix (BM) is formed on the opposing substrate as a shading film for covering the space between adjacent pixel electrodes.

This structure requires some mask alignment margin between the pixel electrode and signal line and some substrate bonding margin for the pixel electrode and adjacent BMs. A ratio (called an opening ratio) of an effective pixel electrode area to the whole pixel electrode area becomes small. As pixels are made finer, the opening ratio becomes smaller.

The pixel electrode is formed in some cases at a layer level higher than the signal line (e.g., on a planarizing film formed on an interlayer insulating film). In this case, the pixel electrode area and the signal line area are formed overlapped to use the signal line itself as BM (TFT side BM). The mask alignment margin between the pixel electrode and signal line and the substrate bonding margin for the pixel electrode and adjacent BM can be made not so severe.

The structure using the TFT side BM requires two or more interlayer insulating films including the planarizing film. Therefore, back light is absorbed in the interlayer insulating films (particularly near the interface between the interlayer insulating films) and a bright display is difficult. A transmission factor lowers particularly on the low wavelength side.

SUMMARY OF THE INVENTION

It is an object of the present invention to provide a liquid crystal display providing a high image quality and a low power consumption.

According to one aspect of the present invention, there is provided a liquid crystal display having thin film transistors, an active matrix substrate, comprising: a first substrate; a plurality of scan lines formed on said first substrate and extending in the row direction; a plurality of first signal lines formed on said first substrate and intermittently extending in the column direction in an area excepting a cross area with said scan line and an area near the cross area; an interlayer insulating film covering said scan lines and said first signal lines; a plurality of first openings formed through said interlayer insulating film, said first openings exposing said first signal lines; and a plurality of second signal lines formed on said interlayer insulating film, said second signal lines being connected via said first openings to said first signal lines to form signal lines continuous in the column direction.

According to one aspect of the present invention, there is provided a liquid crystal display having an active matrix substrate, comprising: a first substrate; a plurality of island-shaped TFT polysilicon layers disposed in row and column directions on said first substrate in a matrix shape; a gate insulating film formed on said first substrate, said gate insulating film covering said polysilicon layers; a plurality of scan lines formed on said gate insulating film and extending in the row direction; a plurality of first signal lines formed on said gate insulating film and intermittently extending in the column direction in an area excepting a cross area with said scan line and an area near the cross area; an interlayer insulating film covering said scan lines and said first signal lines; a plurality of first openings formed through said interlayer insulating film, said first openings exposing said first signal lines; a plurality of second signal lines formed on said interlayer insulating film, said second signal lines being connected via said first openings to said first signal lines to form signal lines continuous in the column direction; pixel electrodes formed on said interlayer insulating film; and thin film transistors each disposed near the cross area between said scan line and said signal line, said thin film transistor including said TFT polysilicon layer as a channel layer, a gate electrode connected to said scan line, a source electrode connected to said signal line, and a drain electrode connected to said pixel electrode.

According to still another aspect of the present invention, there is provided a liquid crystal display having an active matrix substrate, comprising: a first substrate; a plurality of island-shaped TFT polysilicon layers disposed in row and column directions on said first substrate in a matrix shape; a gate insulating film formed on said first substrate, said gate insulating film covering said polysilicon layers; a plurality of scan lines formed on said gate insulating film, extending in the row direction, and crossing said polysilicon layers; a plurality of first signal lines formed on said gate insulating film and intermittently extending in the column direction in an area excepting a cross area with said scan line and an area near the cross area; an interlayer insulating film covering said scan lines and said first signal lines; a plurality of first openings formed through said interlayer insulating film, said first openings exposing said first signal lines; a plurality of second signal lines formed on said interlayer insulating film, said second signal lines being connected via said first openings to said first signal lines to form signal lines continuous in the column direction; pixel electrodes formed on said interlayer insulating film and having an extension portion in the column direction in each pixel area; a common electrode formed on said interlayer insulating film in an area adjacent to each of said pixel electrodes, said common electrode having a portion extending in an area of a plurality of pixels; and thin film transistors each disposed near the cross area between said scan line and said signal line, said thin film transistor including said TFT polysilicon layer as a channel layer, a gate electrode formed by said scan line or connected to said scan line, a source electrode connected to said signal line, and a drain electrode connected to said pixel electrode.

According to still another aspect of the present invention, there is provided a method of manufacturing a liquid crystal display having thin film transistors comprising the steps of: forming an electrode film on a first substrate; etching the electrode film to form a plurality of scan lines extending in a row direction above the first substrate, and a plurality of first signal lines intermittently extending in the column direction above the first substrate in an area excepting a cross area with said scan line and an area near the cross area; forming an interlayer insulating film over the first substrate; forming second signal lines on the interlayer insulating film, the second signal lines connecting the first signal lines via openings to form signal lines continuous in the column direction.

An active matrix type liquid crystal display having a high image quality and a bright image can be manufactured with simplified processes.

A manufacture yield and reliability can be improved.

BRIEF DESCRIPTION OF THE DRAWINGS

FIG. 2 is a brief circuit diagram of the liquid crystal display according to the first embodiment of the invention.

FIG. 5A is a plan view, FIG. 5B is a cross sectional view taken along line Vb–Vb' of FIG. 5A, and FIG. 5C is a cross sectional view taken along line Vc–Vc' of FIG. 5A, respectively showing the main portion of a liquid crystal display according to the second embodiment.

FIG. 13A is a plan view, FIG. 13B is a cross sectional view taken along line XVb–XVb' of FIG. 13A, and FIG. 13C is a cross sectional view taken along line XVc–XVc' of FIG. 1 3A, respectively showing the main portion of the lateral field effect liquid crystal display of the third embodiment.

DETAILED DESCRIPTION OF THE PREFERRED EMBODIMENTS

Embodiments of the invention will be described with reference to the accompanying drawings.

New crystallization techniques or low temperature crystallization techniques have been developed recently, such as laser annealing using excimer laser or the like and promoting crystallization by doping Ni or Ge into amorphous silicon before crystallization. Techniques have been developed which form polycrystalline silicon (polysilicon) by crystallizing amorphous silicon formed on a glass substrate by radiating excimer laser to the amorphous silicon.

The mobility of electrons and holes in polysilicon is from about 50 $cm^2/Vs$ to about 100 $cm^2/Vs$ which is far larger than that of electrons and holes in amorphous silicon. If a polysilicon TFT is used, a transistor faster than an amorphous silicon TFT can be obtained.

With reference to FIG. 1 to FIG. 4B, an active matrix type liquid crystal display according to the first embodiment of the invention will be described.

Figure 1:
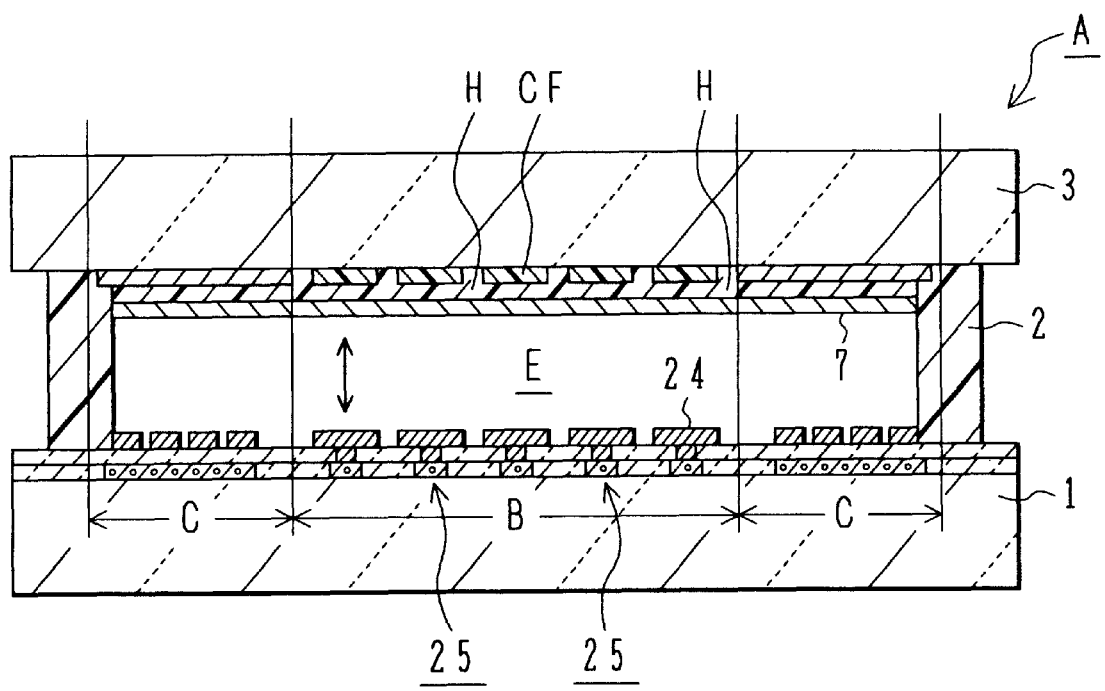
FIG. 1 is a schematic cross sectional view of a liquid crystal display according to a first embodiment of the invention.

FIG. 1 is a cross sectional view of an active matrix type liquid crystal display which has an image display area and a peripheral circuit area for controlling the display area both formed on the same substrate.

The active matrix type liquid crystal display A has a first substrate 1, a second substrate 3 opposing the first substrate 1, and a liquid crystal layer E sandwiched between the substrates 1 and 3.

On the first substrate 1, a display area B for displaying an image is formed. A peripheral circuit area C for driving the display area B is formed around the display area B. A sealing member 2 disposed at the outer periphery of the peripheral circuit area C hermetically seals the liquid crystal layer E in a housing space. The display area B and peripheral circuit area C have a plurality of TFTs 25 having a channel layer made of polysilicon. In the display area B, a pixel electrode 24 is connected to a pixel TFT 25.

On the second substrate 3 opposing the first substrate 1, a plurality of color filters CF are formed. A planarizing film H formed on the color filters CF planarizes uneven surfaces of the color filters CF.

FIG. 2 is an equivalent circuit diagram schematically showing an example of the circuit structure of the active matrix type liquid crystal display A.

The active matrix type liquid crystal display A has the display area B of a laterally long rectangle shape and the peripheral circuit area C having a scan line driver C1 and a signal line driver C2 disposed around the display area B.

A number of signal lines 11, 11, 11, . . . extend in the column direction in the display area B. Each signal line 11 transmits image data of three colors, red (R), green (G) and blue (B) or the like.

A number of scan lines 15, 15, 15, . . . extend in the row direction in the display area B. Each scan line 15 selects pixels of a corresponding row.

A pixel 21 is disposed at each cross point of the signal line 11 and scan line 15. A number of pixels 21, 21, 21, . . . are disposed in a matrix shape in the display area B. Each display unit constituted of three pixels can display three colors RGB.

In the example shown in FIG. 2, a double-gate TFT is used as the pixel TFT 25. A single gate TFT may be used as the pixel TFT 25. The double-gate TFT is effective for reducing leak current.

The source electrode S of the pixel TFT 25 is connected to the signal line 11. The gate electrode G of the pixel TFT is connected to the scan line 15. The drain electrode D of the pixel TFT 25 is connected to a parallel circuit of a liquid crystal cell 23 and a storage capacitor 27.

The liquid crystal cell 23 has the pixel electrode 24, liquid crystal layer E and a common electrode 7 (FIG. 1).

The storage capacitor 27 of the pixel 21 stores signal charges supplied from the signal line 11 when its scan line is selected, and holds it until the scan line is selected next. The storage capacitor 27 is formed when necessary. If the storage capacitor 27 is not formed, a voltage at the pixel electrode changes in a short time if, for example, the pixel TFT 25 leaks. The storage capacitor 27 is effective for holding the charged voltage for a long time.

The circuit operation will be described briefly.

A plurality of scan lines 15, 15, 15, . . . are driven by the scan line driver C1 to sequentially scan a number of pixels 21 in the column direction. While these pixels are scanned, a plurality of pixels 21 disposed in the row direction receive image data from a plurality of signal lines 11, 11, 11, . . . driven by the signal line driver C2.

Figure 3A:
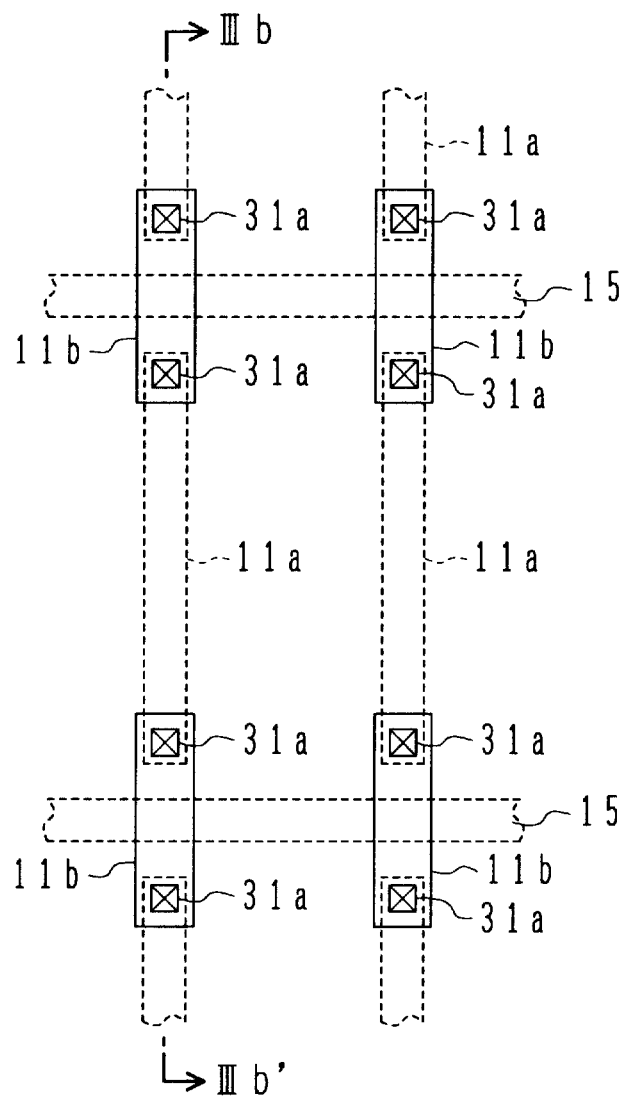
FIG. 3A is a plan view and FIG. 3B is a cross sectional view taken along line IIIb–IIIb' of FIG. 3A, respectively showing mainly scan and signal lines of the liquid crystal display of the first embodiment.
Figure 3B:
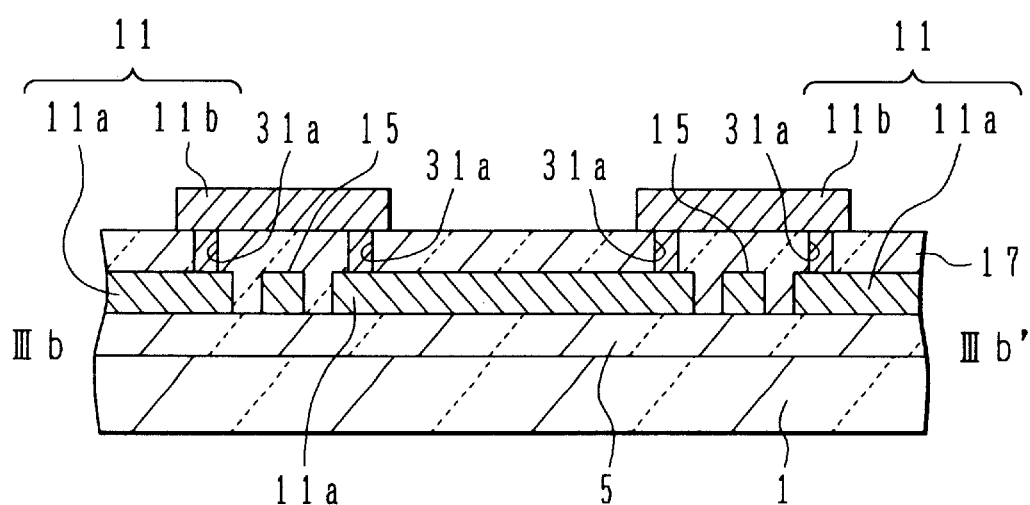

FIGS. 3A and 3B show the structure of signal lines 11 and scan lines 15 formed on the first substrate of the active matrix type liquid crystal display. For the simplicity of drawing, the other constituent elements are not shown.

FIG. 3A is a plan view, and FIG. 3B is a cross sectional view taken along line IIIb–IIIb' of FIG. 3A.

As shown in FIG. 3B, a gate insulating film 5 is formed on a first glass substrate 1. On this gate insulating film 5, a plurality of scan lines 15 extending in the row direction and a plurality of first signal lines 11a extending in a direction crossing the scan lines are formed. The first, signal lines 11a are formed intermittently in an area excepting the cross area with the scan line and its nearby area.

An interlayer insulating film 17 is formed over the gate insulating film 5.

First openings 31 are formed through the interlayer insulating film 17 in areas corresponding to the areas of opposite ends of the first signal line 11a.

Second signal lines 11b are intermittently formed on the interlayer insulating film 17, connecting the first signal lines 11a via the first openings 31a. The first and second signal lines 11a and 11b constitute a signal line 11.

The second signal line 11b formed at the second level shown by a solid line in FIG. 3A is preferably formed only in a cross area, and its nearby area, between the signal line 11 and the scan line 15 formed at the first level shown by a broken line. The signal line 11 and scan line 15 have a bridge structure that both the lines cross at two levels only in the cross area and its nearby area.

Most of the areas of the scan line 15 and first signal line 11a can be formed at the first level (on the gate insulating film 5). The scan line 15 and first signal lines 11a can be formed by using the same material and same process. The surface of the gate insulating film 5 can be efficiently used.

The area occupied by the second signal line 11b formed on the interlayer insulating film 17 is small so that the surface of the interlayer insulating film 17 can be used efficiently for other purposes.

The pixel electrode can be formed in a broad surface area of the interlayer insulating film 17 excepting the area occupied by the second signal line 11b, i.e., the area surrounded by the solid line in FIG. 3A. The mask alignment margin between the signal line and pixel electrode can be made large and a larger opening ratio can be obtained.

An active matrix type liquid crystal display according to the second embodiment will be described.

Figure 4A:
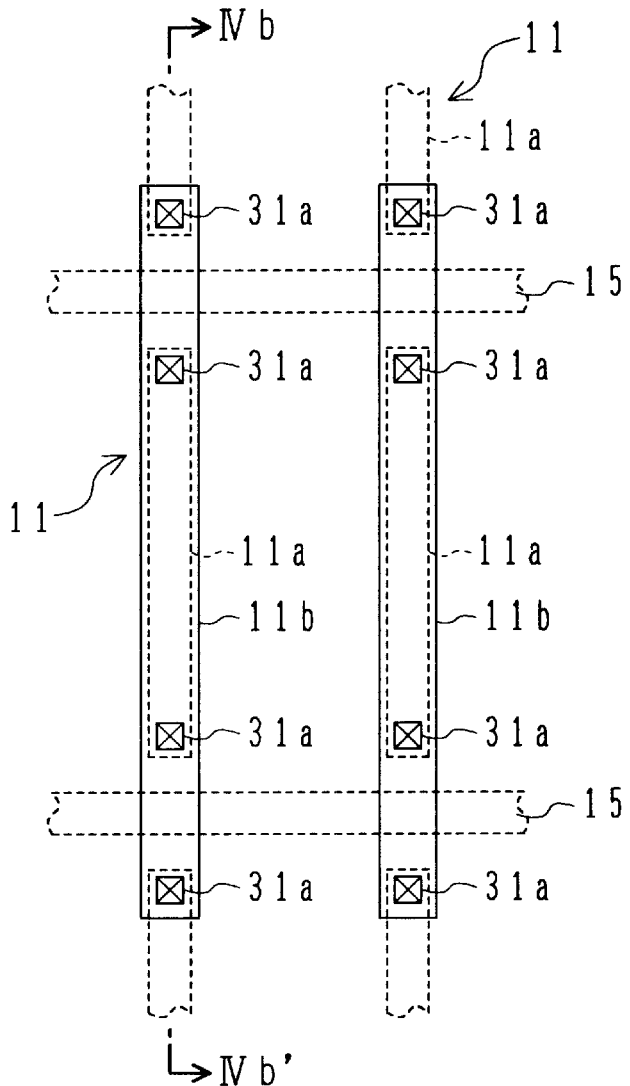
FIG. 4A is a plan view and FIG. 4B is a cross sectional view taken along line IVb–IVb', respectively showing mainly scan and signal lines of a liquid crystal display according to a second embodiment of the invention.
Figure 4B:
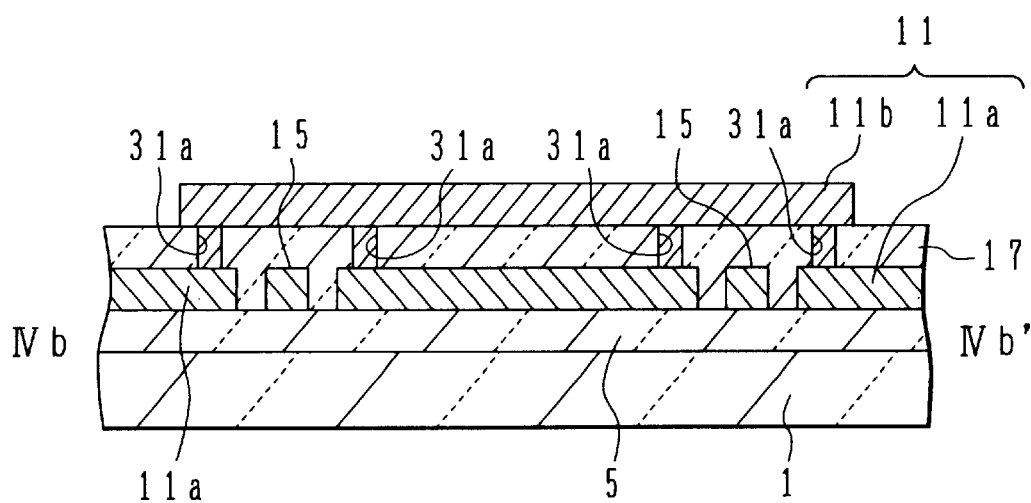

FIGS. 4A and 4B show the outline structure of signal lines 11 and scan lines 15 mainly at the cross area thereof formed on the first substrate 1. FIG. 4A is a plan view and FIG. 4B is a cross sectional view taken along line IVb–IVb' of FIG. 4A. In FIGS. 4A and 4B, like elements to those shown in FIGS. 3A and 3B are represented by using identical reference numerals and the description thereof is omitted.

As shown in FIG. 4B, first signal lines 11a are intermittently formed in the column direction in an area excepting the cross area with the scan line 15 and its nearby area.

Two openings 31a and 31a are formed through the interlayer insulating film 17 above the first signal line 11a.

Second signal lines 11b are formed on the interlayer insulating film 17. In the example shown in FIGS. 4A and 4B, each second signal line 11b is connected to the first signal lines 11a via four openings 31a, the four openings including two openings 31a and 31a formed near opposite ends of the first signal line 11a and two openings 31a and 31a formed near ends of two first signal lines adjacent to the first-mentioned first signal line in the column direction.

The second signal line extends from the end of one of two first signal lines 11a adjacent to one first signal line 11a disposed therebetween in the column direction, to the end of the other.

As shown in FIGS. 4A and 4B, first and second signal lines 1a and 11b are connected to constitute one continuous signal line 11.

The scan line 15 and first signal lines 11a can be formed at the same level on the gate insulating film 5. The scan line 15 and first signal lines 11a can be formed by using the same material and same process. The surface of the gate insulating film 5 can be efficiently used.

The area of the first and second signal lines extending in parallel at upper and lower levels is large. Therefore, the total sheet resistance of the signal line 11 lowers. Even if one of the first and second signal lines 11a and 11b is broken in the area where the lines extend in parallel at the upper and lower levels, the electrical connection of the signal line 11 can be retained.

An active matrix type liquid crystal display according to another embodiment will be described.

FIGS. 5A to 5C show the structure of an active matrix type liquid crystal display to which the structure shown in FIGS. 3A and 3B is applied.

FIG. 5A is a plan view, FIG. 5B is a cross sectional view taken along line Vb–Vb', and FIG. 5C is a cross sectional view taken along line Vc–Vc'.

A number of pixels are disposed in the display area B of the active matrix type liquid crystal display.

FIG. 5A shows only a part of the display area B. Actually, similar structure is repeated to the column and row direction as are proceeding embodiments shown below.

As shown in FIG. 5B, on a first substrate 1 such as a glass substrate, a TFT polysilicon layer 41a of an island shape is formed. The TFT polysilicon layer 41a is used as a channel layer of a pixel TFT and the like. A gate insulating film 5 such as a silicon oxide film is formed on the first substrate 1, covering the TFT polysilicon layer 41a. On the gate insulating film 5, a gate electrode G, a scan line 15 (FIG. 5A) and a first signal line 11a are formed by using a single metal layer, a metal lamination layer or the like.

The scan line 15 and the gate electrode G of the pixel TFT 25 prominent in the direction from the scan line 15 to the pixel electrode 24, are formed by the same film, e.g., a Cr film having a thickness in a range from 150 nm to 300 nm. The first signal line 11a can be made of the Cr film. The scan line 15, gate electrode G, and first signal line 11a may be made of material containing Al-Nd alloy.

The interlayer insulating film 17 is formed on the gate insulating film 5, covering the gate electrode G, scan line 15 and first signal line 11. The interlayer insulating film 17 is made of photosensitive polyimide having a thickness of, e.g., about 2 $\mu$m.

A second signal line 11b and pixel electrode 24 are formed on the interlayer insulating film 17.

The pixel electrode 24 is a transparent electrode made of an ITO film having a thickness of, e.g., 100 nm. For example, the second signal line 11b is made of Mo/Al, the Mo thickness being in a range from about 50 nm to about 100 nm and the Al thickness being in a range from about 200 nm to about 300 nm.

A plurality of openings 31 are formed through the interlayer insulating film 17.

A first opening 31a is formed above the end of the first signal line 11a to connect the first and second signal lines 11a and 11b. A second opening 31b is formed above the drain region D of the channel layer 41a of the pixel TFT 25 made of the TFT polysilicon layer 41a, to connect the drain region D and pixel electrode 24 via the interlayer insulating film 17 and gate insulating film 5.

A third opening 31c is formed above the source region S of the polysilicon layer 41a to connect the source region S and second signal line 11b.

As shown in FIG. 5C, the first signal line 11a extends in the column direction under a gap 26b extending in the column direction between adjacent pixel electrodes 24, the first signal line covering the gap 26b. The scan lines 15 are formed in areas corresponding to the gaps between pixel electrodes disposed in the column direction.

As shown in FIG. 5A, on the interlayer insulating film 17 on the first substrate 1 side, the pixel electrodes 24 and second signal lines 11b indicated by solid lines are formed. The pixel electrode 24 is of generally a rectangle shape. A plurality of pixel electrodes are disposed in a matrix shape. Gaps 26a and 26b extending in the row and column directions are formed between adjacent pixel electrodes 24.

Under the gap 26a extending in the row direction between adjacent pixel electrodes 24, the scan line 15 extends in the row direction, covering the area corresponding to the gap 26a and projecting toward both sides.

A recess is formed at each of the four corners of the pixel electrode 24 of generally the rectangle shape. An opening 37 is formed as defined by the recesses of the four corners of the four pixel electrodes adjacent in the row and column directions.

The second signal line 11b indicated by the solid line is formed in the area of this opening 37.

The area including the third opening 31c has an area not covered with the scan line 15, first and second signal lines 11a and 11b. An opposing black matrix 51 is formed on the second substrate 3 (FIG. 1) in an area corresponding to the area inclusive of the opening 37.

With the structure described above, although the second signal line 11b crosses the scan line 15, it is spatially separated from the scan line 15 by the interlayer insulating film 17. The signal line 11 and scan line 15 are not electrically shorted.

The gap area 26a and scan line 15 formed in the row direction between adjacent pixel electrodes 24 are overlapped. The gap area 26b and first signal line 11a formed in the column direction between adjacent pixel electrodes 24 are overlapped. The signal line 11 and scan line 15 also function as the TFT side black matrix BM.

As compared to covering the gaps 26a and 26b between adjacent pixel electrodes 24 only by the opposing BM, an alignment margin between the pixel electrode 24 and opposing BM 51 can be relaxed. The substrate area to be occupied by pixel electrodes 24 can be broadened and the effective opening ratio of each pixel can be improved.

The BM structure of this kind cannot be realized if the signal line 11 is made of only a wiring layer on the interlayer insulating film and the pixel electrode 24 is formed at the same level.

Liquid crystal orientation is likely to be disturbed at a peripheral area of each pixel. By forming BM in the peripheral area of the pixel electrode 24, a display distortion can be avoided which may be caused by a disturbance of liquid crystal orientation in the peripheral area of the pixel electrode 24. Color separation between a number of pixels 21 (FIG. 1) disposed in the display area B can be made good. Light radiation of the liquid crystal display becomes clear.

Since the interlayer insulating film is made of a single layer, the structure can be simplified. As compared to using two or more interlayer insulating films, a light transmission factor can be raised.

Figure 6A:
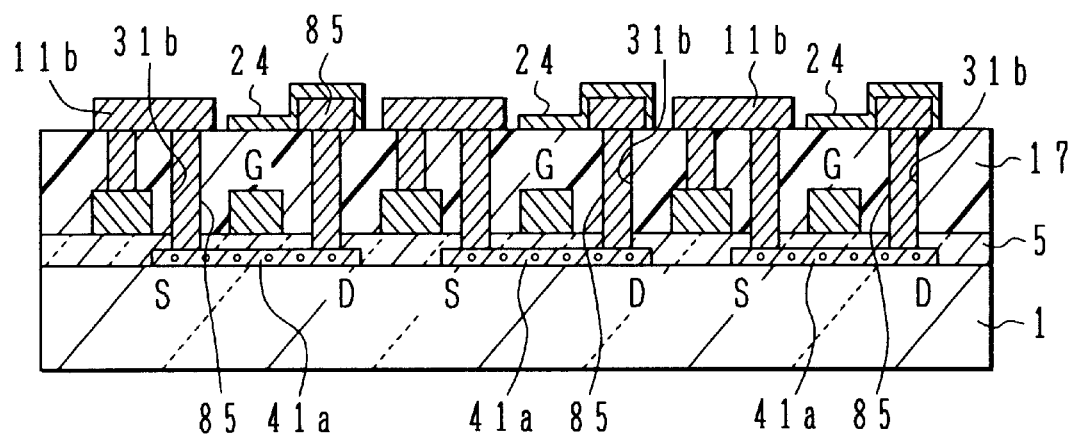
FIG. 6A is a cross sectional view taken along line VIb––VIb' of FIG. 5A
Figure 6B:
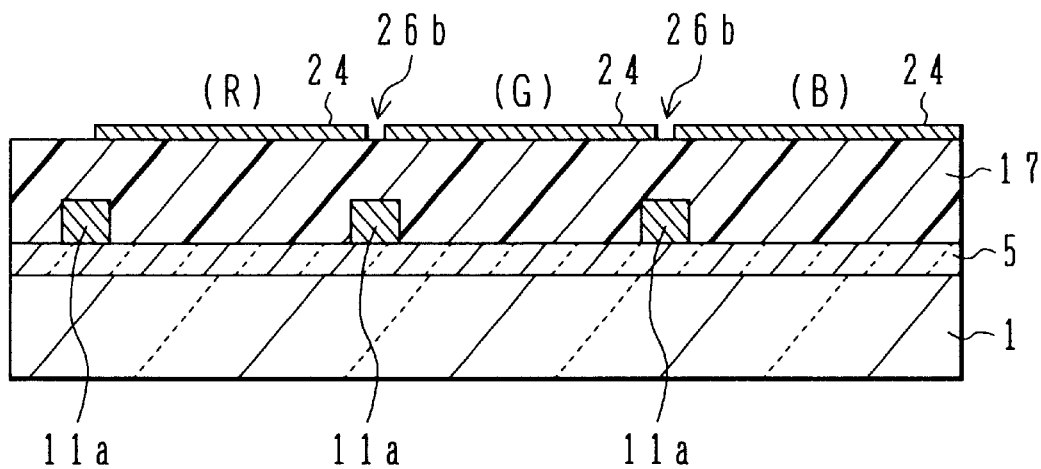
FIG. 6B is a cross sectional view taken along line VIc–VIc' of FIG. 5C, respectively showing the main portion of a modification of the liquid crystal display.

FIGS. 6A and 6B show a modification of the active matrix type liquid crystal display shown in FIGS. 5A to 5C.

FIG. 6A corresponds to FIG. 5B, and FIG. 6B corresponds to FIG. 5C. In FIGS. 6A and 6B, like elements to those shown in FIGS. 5B and 5C are represented by using identical reference numerals, and the description thereof is omitted.

As shown in FIG. 6A, in this modification of the active matrix type liquid crystal display, pad metal 85 is filled in the opening 31b. The pad metal 85 is made of material having a resistance lower than ITO used by the pixel electrode, such as Mo and Ti. The low resistance pad metal 85 electrically connects the pixel electrode 24 and the drain region D of the pixel TFT 25. As compared with the connection by only ITO, a voltage drop across the connection area can be lowered.

Al may be used as the pad metal. If Al is used, a barrier metal such as Mo is preferably used in order to prevent Al corrosion by the cell effect. Instead of the barrier metal, other methods may also be used if similar effects can be obtained.

As shown in FIG. 6B, the first signal line 11a overlaps the gap 26b between adjacent pixel electrodes 24.

Figure 7A:
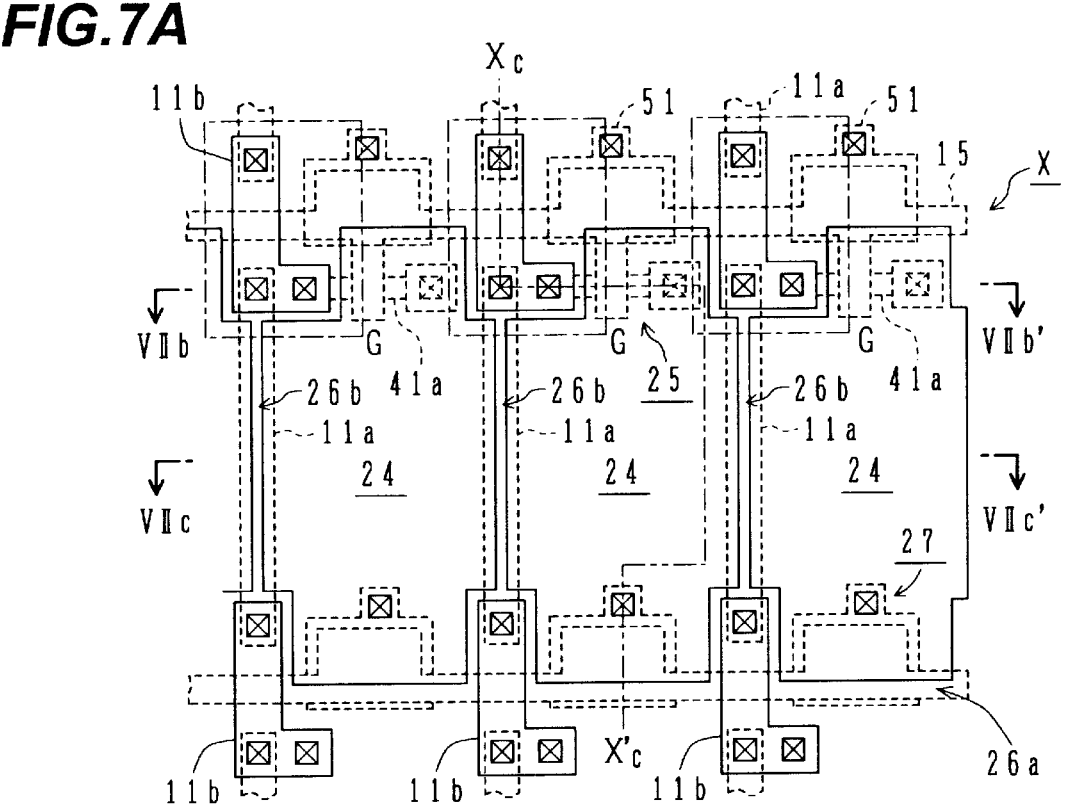
FIG. 7A is a plan view.
Figure 7B:
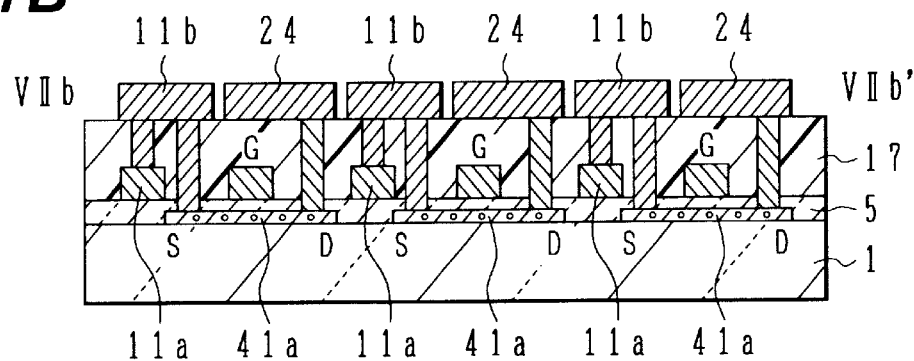
FIG. 7B is a cross sectional view taken along line VIIb–VIIb' of FIG. 7A.
Figure 7C:
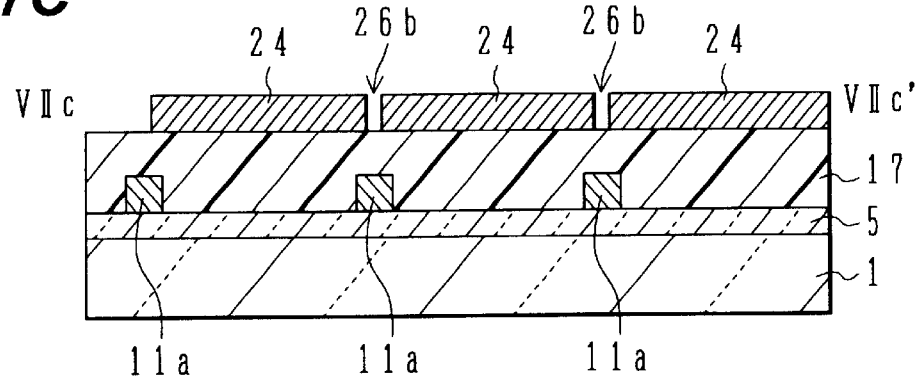
FIG. 7C is a cross sectional view taken along line VIIc–VIIc' of FIG. 7A, respectively showing the main portion of a liquid crystal display.

FIGS. 7A to 7C show an active matrix reflection type liquid crystal display according to another embodiment of the invention. FIG. 7A is a plan view, FIG. 7B is a cross sectional view taken along line VIIb–VIIb' and FIG. 7C is a cross sectional view taken along line VIIc–VIIc'. Different points from the above-described embodiments will be described mainly.

The details of a storage capacitor 27 shown in FIGS. 7A to 8B will be later described with reference to FIGS. 9A to 9C.

As shown in FIG. 7B, a second signal line 11b and a pixel electrode 24 are made of the same metal material. The metal material is a Mo/Al lamination film. The Mo film thickness is in a range from 50 nm to 100 nm and the Al film thickness is in a range from 200 nm to 300 nm. The Mo/Al lamination film is made of an opaque material having a high reflectivity and functions as a reflection surface of a reflection type liquid crystal display.

The Mo film is used for ohmic contact with a TFT polysilicon layer 41a, and also used for a barrier metal for preventing mutual diffusion of Al and TFT polysilicon 41a.

As shown in FIG. 7A, a scan line 15 is formed in an area inclusive of a gap 26a extending in the row direction between adjacent pixel electrodes 24. A first signal line 11a is formed in an area inclusive of a gap 26b extending in the column direction between adjacent pixel electrodes 24.

As shown in FIG. 7C, the first signal line 11a is formed in the area including the gap 26b extending in the column direction between adjacent pixel electrodes 24.

The second signal line 11b and scan line 15 are spatially separated at the cross area by an interlayer insulating film 17. The signal line 11 (11a, 11b) and scan line 15 are not electrically shorted.

The pixel electrode 24 and second signal line 11b of the reflection type liquid crystal display of this embodiment may be made by the same process. If they are made by the same process, a mask alignment margin between the pixel electrode 24 and second signal line 11b is not necessary to be considered. The opening ratio can be improved further.

Figure 8A:
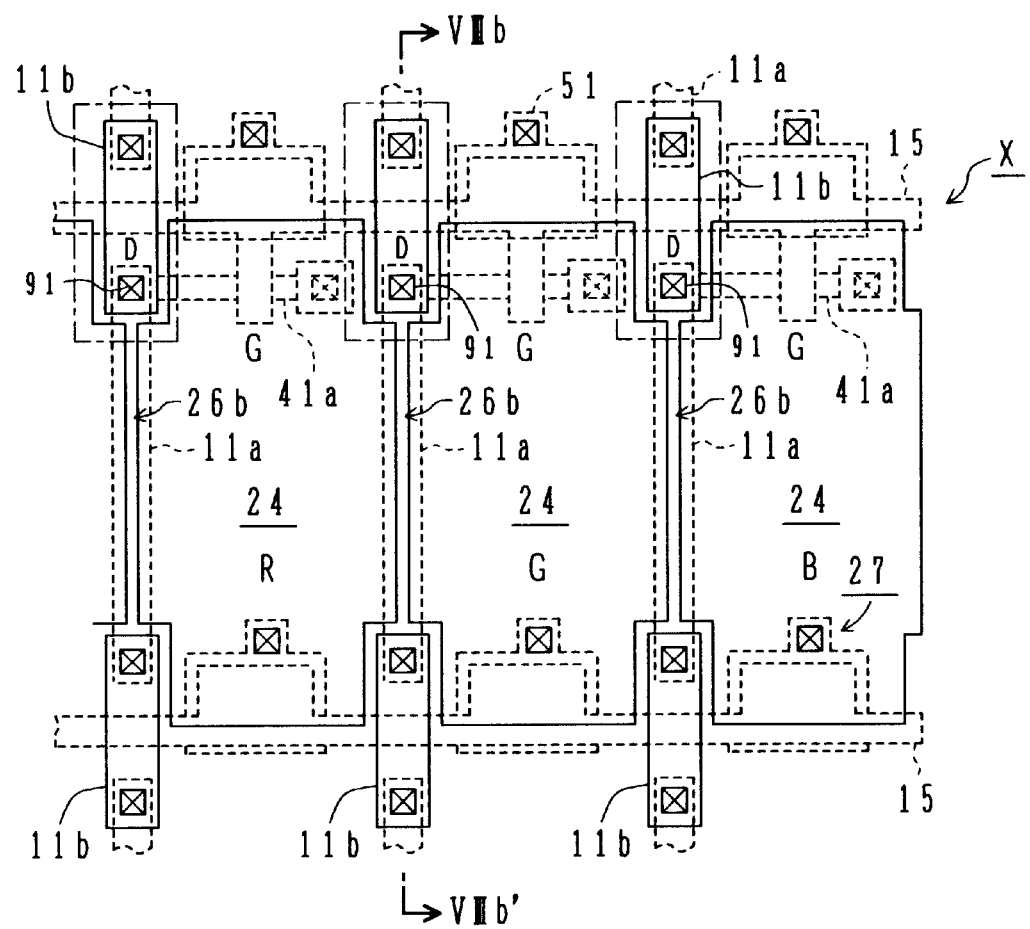
FIG. 8A is a plan view and FIG. 8B is a cross sectional view taken along line VIIIb–VIIIb' of FIG. 8A, respectively showing the main portion of a modification of the liquid crystal display.
Figure 8B:
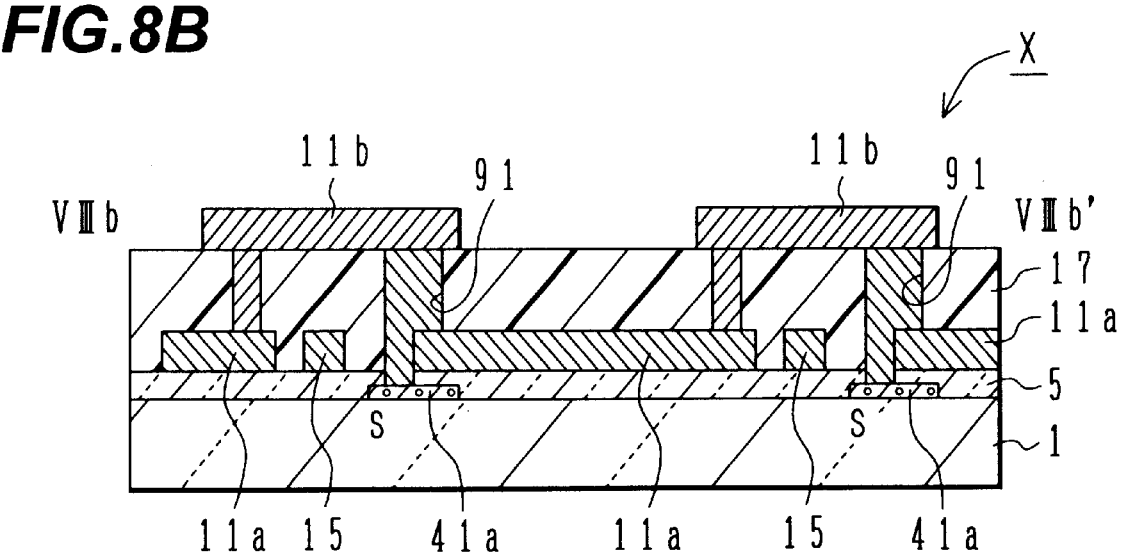

FIGS. 8A and 8B show a modification of the reflection type liquid crystal display X. FIG. 8A is a plan view and FIG. 8B is a cross sectional view taken along line XIIIb–XIIIb' of FIG. 8A.

As shown in FIG. 8B, a connection between a second signal line 11b and a first signal line 11a and a connection between a second signal line 11b and a drain region D are established in the same opening 91.

Since one opening 91 can be used for both the connection between the second signal line 11b and first signal line 11a and the connection between the second signal line 11b and drain region D, an area occupied by the opening and an area occupied by a wiring connection between openings can be made small. The opening ratio can be improved further.

Figure 9A:
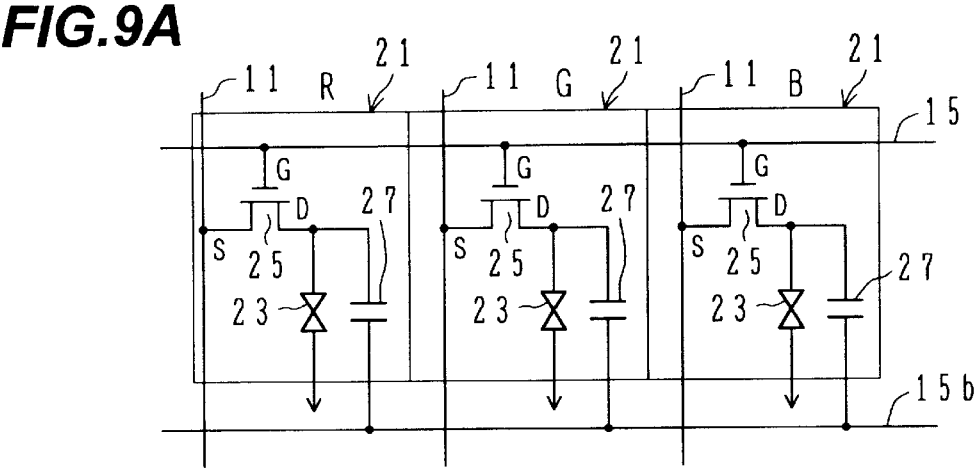
FIG. 9A is a circuit diagram.
Figure 9B:
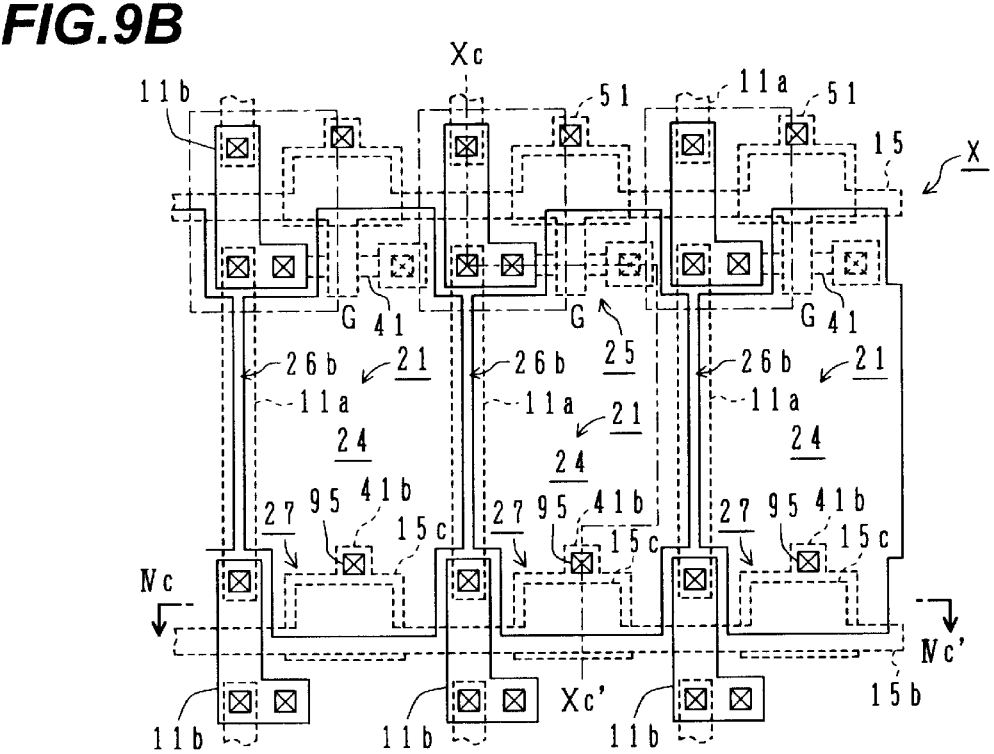
FIG. 9B is a plan view and FIG. 9C is a cross sectional view taken along line IVa–IVa' of FIG. 9B, respectively showing the structure of the storage capacitor and its nearby area according to a modification of the liquid crystal display.
Figure 9C:
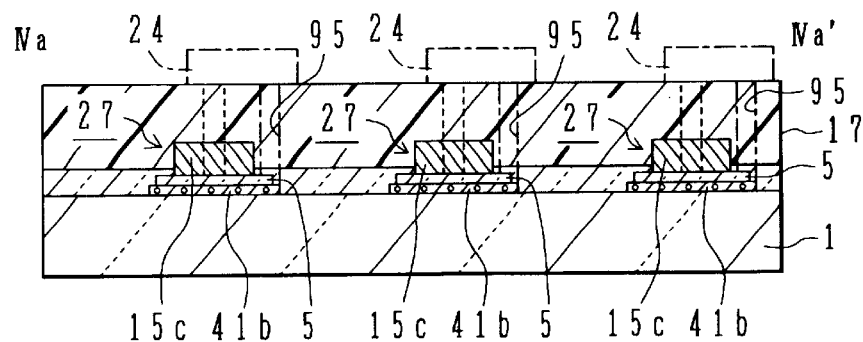

With reference to FIGS. 9A to 9C, the structure of the storage capacitor 27 according to a modification of the reflection type liquid crystal display will be described.

FIG. 9A is an equivalent circuit including three pixels corresponding to RGB. FIG. 9B is a plan view showing the element structure and FIG. 9C is a cross sectional view taken along line IVc–IVc' of FIG. 9B.

As shown in FIG. 9A, in each of pixels 21, 21 and 21 of RGB, a storage capacitor 27 is formed between the drain D of the pixel TFT 25 and the scan line 15b of a pixel adjacent to the subject pixel 21 in the column direction.

The pixel electrode 24 is connected to the TFT polysilicon layer 41a via the opening 95.

A MOS capacitance is formed by the storage capacitor polysilicon layer 41b on the first substrate 1, the gate insulating film 5 on this layer 41b, and the scan line 15b of a pixel adjacent to the subject pixel 21 in the column direction.

More particulaly, the pixel electrode 24 and scan line 15b of a pixel adjacent to the subject pixel in the column direction partially overlap. The scan line 15b of a pixel adjacent to the subject pixel 21 has a prominent part 15c under the pixel electrode 24 of the subject pixel 21. The prominent part 15c forms a capacitance relative to the pixel electrode.

As shown in FIG. 9C, a polysilicon layer 41b of the storage capacitor 27 formed on the first substrate 1 (FIG. 9C) is formed in the area including the prominent part 15c.

The polysilicon layer 41b of the storage capacitor 27 is connected to the pixel electrode 24 of the subject pixel via an opening 95.

A MOS capacitance is formed by the prominent part 15c of the scan line 15b, the polysilicon layer 41b of the storage capacitor 27, and the gate insulating film 5 formed therebetween. This MOS capacitance forms the storage capacitor 27 connected to the pixel electrode 24.

Since the storage capacitor 27 can be formed in an area under the pixel electrode 24, the display area can be used efficiently.

FIGS. 10A to 10J are cross sectional views taken along line Xc–Xc' shown in FIG. 7A illustrating manufacture process for the display area B of the liquid crystal display.

Figure 10A:
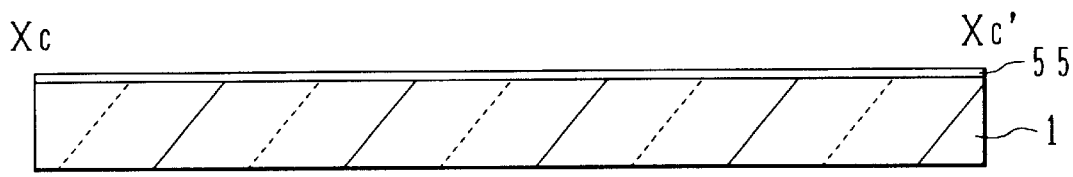
FIGS. 10A to 10J are cross sectional views illustrating processes of manufacturing the display area of a liquid crystal display.

As shown in FIG. 10A, an underlie insulating film (SiO$_2$) 55 is formed on a first substrate 1 by plasma CVD. The material of the first substrate 1 is glass, for example, #1737 glass of Corning Glass Works. The reaction gas used by plasma CVD is, for example, a mixture gas of SiH$_4$ and N$_2$O. The film thickness of the insulating film (SiO$_2$) 55 is, for example, in a range from 30 nm to 100 nm, or preferably about 50 nm.

In the following description, the substrate formed with the underlie insulating film (SiO$_2$) 55 on the first substrate 1 is called a first substrate 1.

Figure 10B:
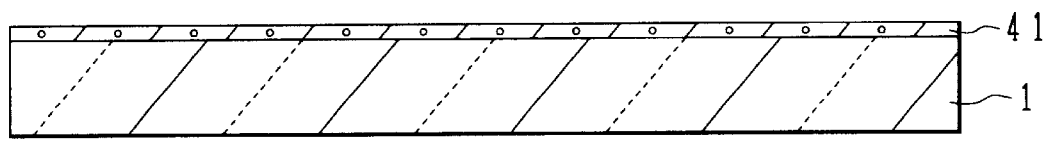

As shown in FIG. 10B, on the first substrate 1, an amorphous silicon film 41 is formed by plasma CVD. The thickness of the amorphous silicon film 41 is in a range from 30 nm to 100 nm, or preferably about 50 nm.

The amorphous silicon film 41 is crystallized to form a polysilicon film, by a crystallization method using excimer pulse laser. The radiation wavelength of the excimer pulse laser is 308 nm. The laser energy density is, for example, in a range from 300 mJ/cm$^2$ to 400 mJ/cm$^2$.

Figure 10C:
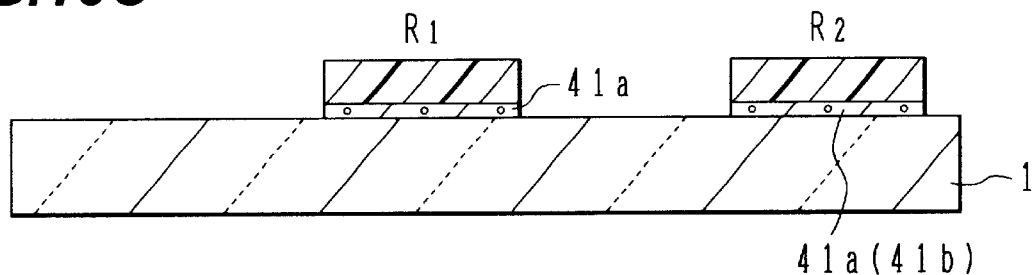

As shown in FIG. 10C, resist masks are formed by well known photolithography. By using the photoresist masks R1 and R2, the polysilicon layer 41 is etched to form polysilicon layers 41a of an island shape through reactive ion etching (RIE) using fluorine containing reaction gas. After this etching, the photoresist masks R1 and R2 are removed. Polysilicon layer 41a for TFT also works as a polysilicon layer 41b (FIG. 9C) forming a storage capacitance.

Figure 10D:
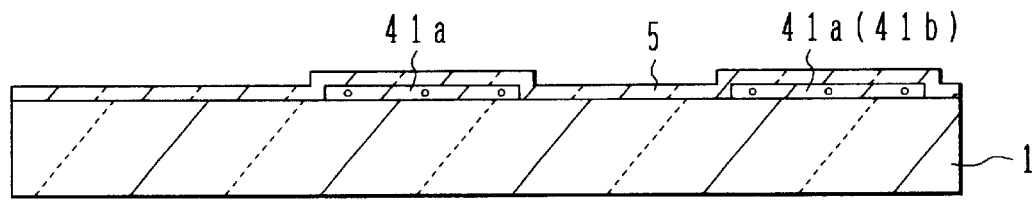

As shown in FIG. 10D, a gate insulating film (SiO$_2$) 5 is formed by plasma CVD. The reaction gas used by plasma CVD is a mixture gas of SiH$_4$ and N$_2$O. The thickness of the gate insulating film 5 is in a range from 80 nm to 300 nm, or preferably about 150 nm.

Figure 10E:
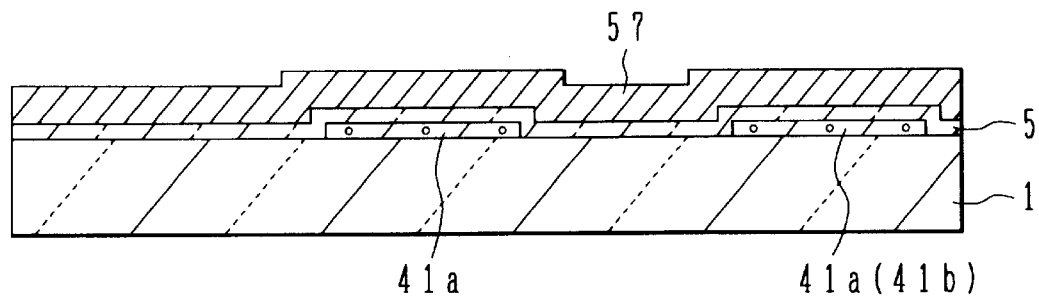

As shown in FIG. 10E, a Cr film 57 is formed on the gate insulating film 5 by sputtering. A thickness of the Cr film 57 is in a range from 150 nm to 300 nm, or preferably 200 nm.

Figure 10F:
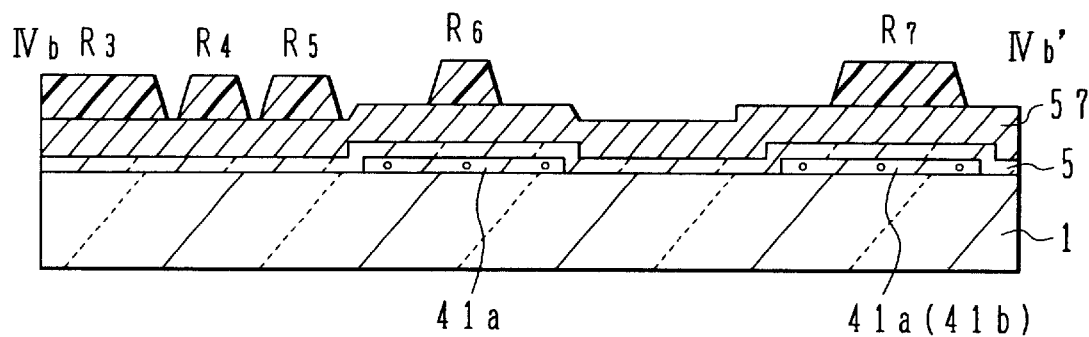

As shown in FIG. 10F, photoresist masks R3 to R7 for a gate electrode G and scan lines 15 are formed by photolithography.

Figure 10G:
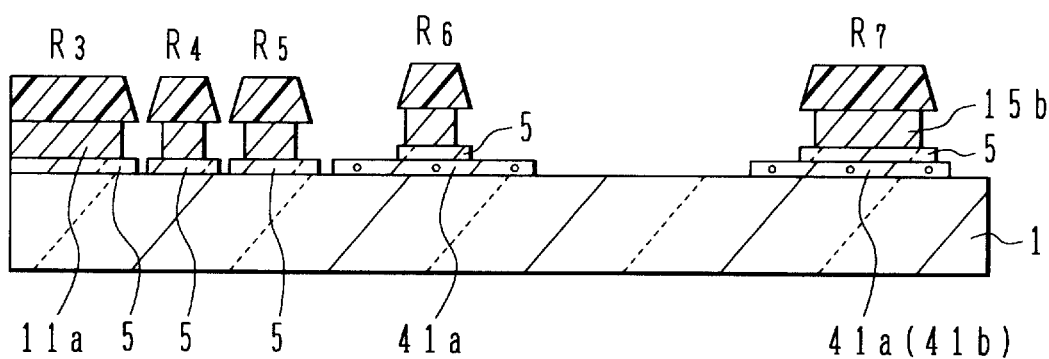

As shown in FIG. 10G, by using the resist masks R3 to R7, the Cr film 57 is wet-etched. Next, by using the same resist masks R3 to R7, the gate oxide film 5 is anisotropically dry-etched. The pattern of the gate insulating film 5 has a shape transferring the shape of the resist masks. The gate insulating film 5 extends right and left from the Cr film pattern side etched by wet etching. The photoresist masks are thereafter removed. A gate electrode G, scan lines 15 and first signal lines 11a are therefore formed. The scan line 15b of the pixel adjacent in the row direction is also shown. Polysilicon film 41b is formed under the scan line 15b via gate dielectrics 5.

Figure 10H:
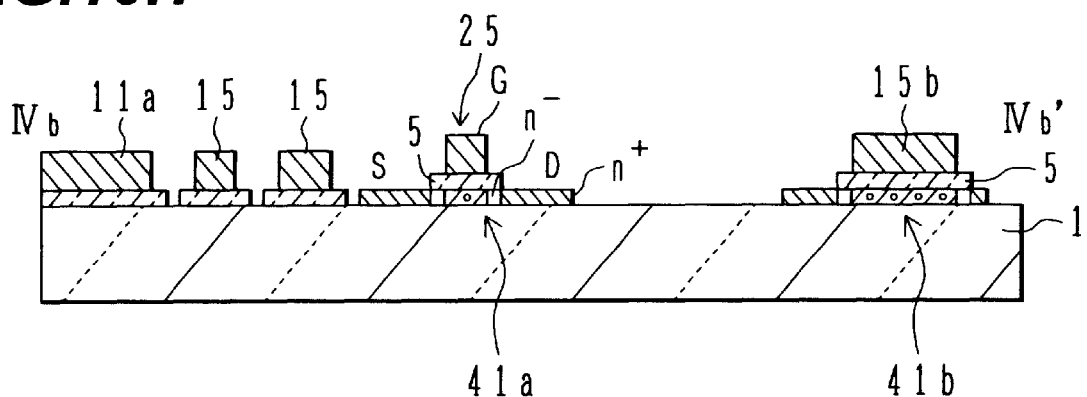

As shown in FIG. 10H, by using the gate electrode as a mask, n-type impurity ions P are implanted into the pixel TFT polysilicon layer 41a. 3% PH$_3$ is used as ion implantation source. The ion implantation conditions are an acceleration energy of 80 keV and a dose of 5×10$^{12}$ cm$^{-2}$. Low impurity concentration n-type active regions are therefore formed in the polysilicon layer outside the gate electrode G.

By using the gate electrode G and gate insulating film 5 as a mask, n-type impurity ions P are implanted at a high concentration. 5% PH$_3$ is used as ion implantation source. The ion implantation conditions are an acceleration energy of 10 keV and a dose of 5×10$^{14}$ cm$^{-2}$. High impurity concentration n-type contact regions (source and drain) are therefore formed in the polysilicon layer outside the gate insulating film 5.

Implanted impurity ions are activated by using excimer laser. The radiation wavelength of the excimer laser is 308 nm and the energy density is in a range from about 230 mJ/cm$^2$ to about 280 mJ/cm$^2$.

The source and drain regions of a high impurity concentration, a channel region of a low impurity concentration, and regions of an intermediate impurity concentration between the source and drain regions and the channel region, are therefore formed.

With the above processes, a TFT 25 can be formed which has a lightly doped drain (LDD) structure with the impurity concentration of the channel layer between the source and drain being set lower than that of the contact region.

Figure 10I:
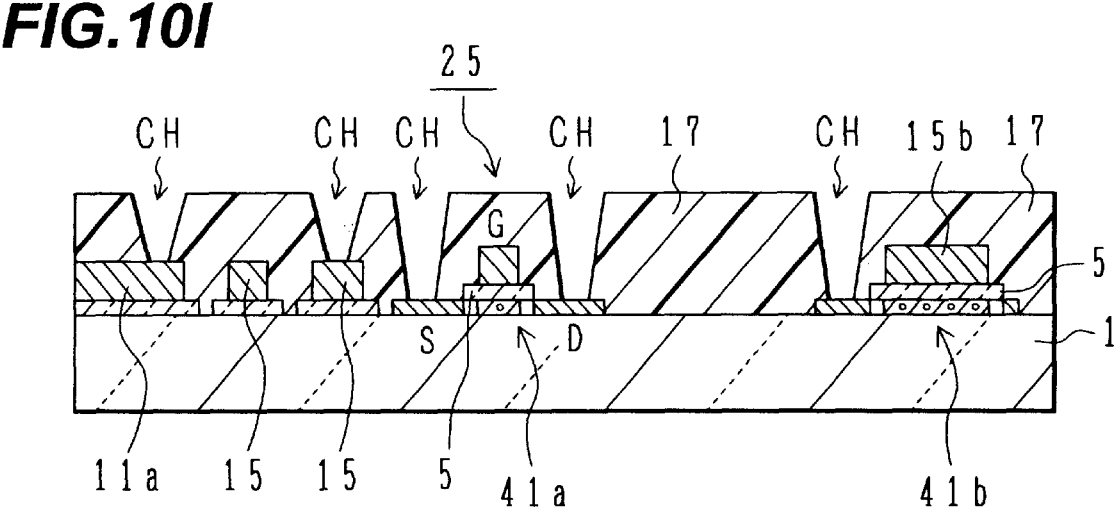

As shown in FIG. 10I, on the substrate structure shown in FIG. 10H, an interlayer insulating film (planarizing film) 17 is formed to a thickness of about 2 μm. The material of the interlayer insulating film 17 is preferably photosensitive polyimide. Instead of photosensitive polyimide, other films may be used such as an acrylic based resin film and an insulating film formed by coating silicon oxide based fine particles dissolved in organic solvent and drying them. Contact holes CH are formed through the interlayer insulating film 17 in areas corresponding to the first signal line 11a, scan line 15, and source S and drain D of the pixel TFT 25, and also in an area corresponding to the n-type polysilicon layer 41a formed at the side of the scan line 15b of the next row pixel.

Figure 10J:
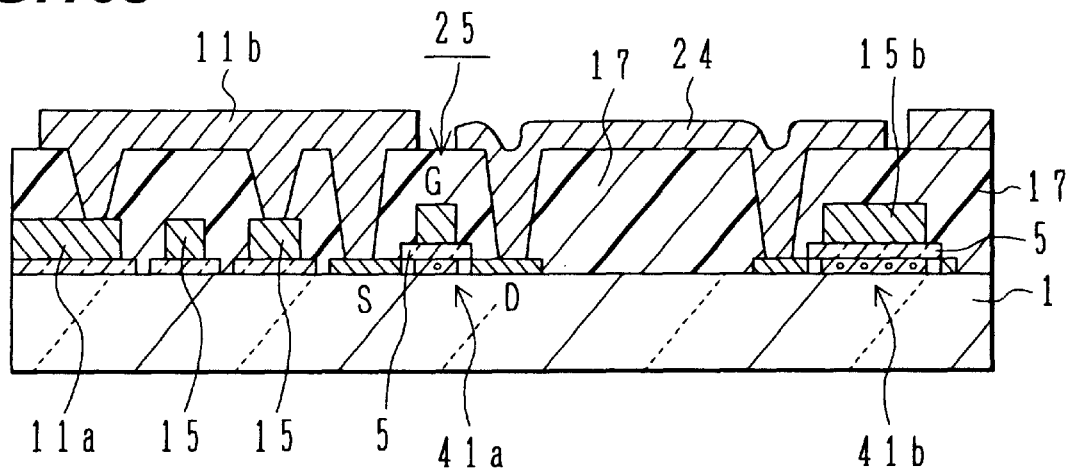

As shown in FIG. 10J, an Mo/Ti layer is deposited on the interlayer insulating film 17 by sputtering. The thickness of the Mo layer is in a range from about 50 nm to about 100 nm, and the thickness of the Ti layer is in a range from about 200 nm to about 300 nm. A resist mask is formed by photolithography. A second signal line 11b is formed by dry etching using chlorine containing gas and wet etching. ITO is deposited on the interlayer insulating film to a thickness of about 100 nm to form a transparent pixel electrode 24.

With the above processes, the first substrate structure of the active matrix type liquid crystal display can be formed.

With these processes, only a single interlayer insulating film is used. Processes can therefore be simplified. For the conventional structure that signal lines and pixel electrodes are formed at different levels, a process of forming a second interlayer insulating film and a process of forming openings through the second interlayer insulating film are added. These processes are not necessary in this embodiment.

If resin such as polyimide is used as the material of the interlayer insulating film to planarize the surface thereof, a plasma-free or sputter-free process is possible. Damages in the semiconductor layer of the substrate can be avoided.

In an active matrix type liquid crystal display using polysilicon TFT, the structure that the display area B and peripheral circuit area C are integrally formed on the first substrate, is preferable.

FIGS. 11A to 11F illustrate manufacture processes for the peripheral circuit area corresponding to the display area manufacture processes shown in FIGS. 10A to 10J.

Processes up to the process of forming gate electrodes on the first substrate are similar to those of the display area manufacture processes shown in FIGS. 10A to 10E.

The peripheral circuit area C includes an area where a peripheral circuit having peripheral circuit TFTs as its main elements is formed and an area where output leads are formed.

Figure 11A:
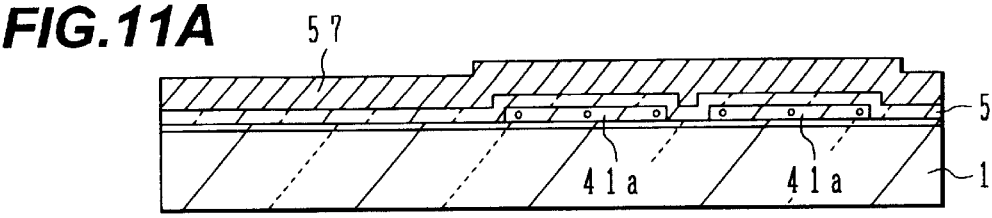
FIGS. 11A to 11F are cross sectional views illustrating processes of manufacturing the peripheral circuit area of the liquid crystal display.

As shown in FIG. 11A, on a first substrate 1, polysilicon films 41a and 41c of an island shape are formed. A gate insulating film 5 is formed on the first substrate 11, covering the island TFT polysilicon films 41a and 41c. A Cr film 57 is formed on the gate insulating film 5. Thereafter, a photoresist film is removed.

Figure 11B:
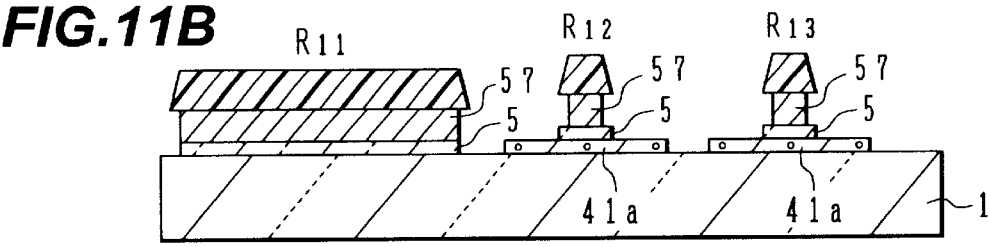

As shown in FIG. 11B, by using photoresist masks R11, R12 and R13, the Cr film 57 is etched to form gate electrodes.

Figure 11C:
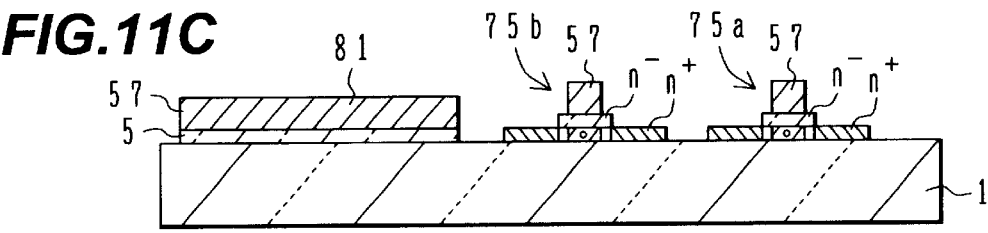
Figure 11D:
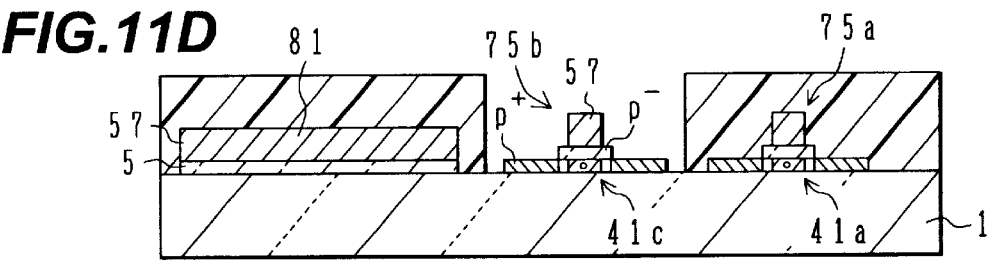

As shown in FIGS. 11C and 11D, an n-channel TFT 75a and a p-channel TFT 75b are formed on the first substrate 1. Polysilicon layers 41a and 41c of the n-channel TFT 75a and p-channel TFT 75b are formed by different impurity ion implanting processes. The n-channel TFT 75a may be formed at the same time when the pixel TFT 25 is formed. Impurities implanted into the p-channel TFT 75b are boron (B). Gas for implanting B at a low concentration is 5% $B_2H_6$. The ion implantation acceleration energy is 60 keV and a dose is $1\times10^{14}$ cm$^{-2}$.

Gas for implanting p-type impurity at a high concentration is 5% $B_2H_6$. An acceleration energy is 10 keV and a dose is $2\times10^{15}$ cm$^{-2}$.

Heat treatment for activating p- and n-type impurities can be performed at the same time when impurities of the pixel TFT 25 are activated.

With the above processes, the n-type TFT 75a and p-type TFT 75b having the LDD structure are formed in the peripheral circuit area C.

In the outer area of the peripheral circuit area C, output lead wires 81 are formed which are made of the same material as the gate electrode film, e.g., a Cr film. The output lead terminal 81 may be formed at the same time when the first signal line 11a or second signal line 11b in the display area B is formed, or may be formed when the first and second signal lines 11a and 11b are formed.

Figure 11E:
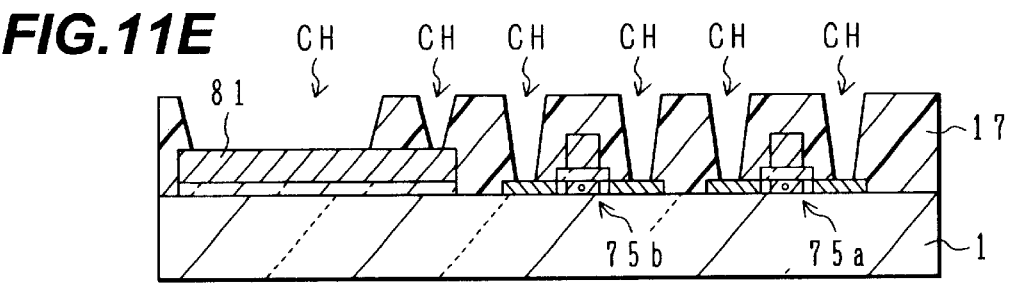

As shown in FIG. 11E, an interlayer insulating film 17 is formed. Openings CH are formed through the interlayer insulating film 17 in the areas corresponding to the source and drain regions of the n-channel TFT 75a and p-channel TFT 75b and the output lead terminal 81.

Figure 11F:
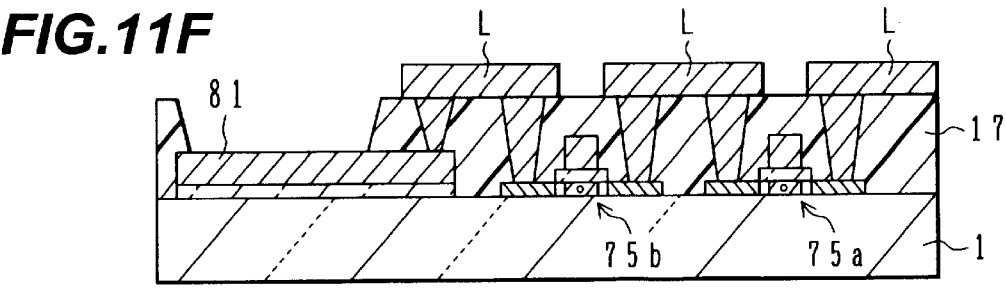

As shown in FIG. 11F, a wiring layer L having a predetermined pattern is formed on the interlayer insulating film 17 to form necessary electrical connections via the openings CH.

If the output lead terminal 81 is formed by the same process as the first signal line 11a, the output lead terminal 81, p- and n-type TFTs 75a and 75b and the like can be formed by using the same material and process as the second signal line 11b.

By using the processes described with reference to FIGS. 10A to 11F, the display area B and peripheral circuit area C can be formed integrally.

The characteristics necessary for the interlayer insulating film 17 are as follows.
(1) It is preferable that the performance of covering surface irregularity and planarizing the surface is excellent.
(2) It is preferable that a transmission factor is 95% (film thickness of 1.5 µm or thinner) or larger.
(3) It is preferable that a heat resistance is 230° C. or higher. The heat resistance is 200 to 250° C. for an acrylic based resin film, 250 to 300° C. for a polyimide based resin film, and 400° C. or higher for an $SiO_2$ film containing a methyl group.
(4) It is preferable that a bulk resistivity is $10^{13}$ Ω·cm or higher.
(5) It is preferable that a dielectric breakdown voltage is 2 MV/cm or higher.
(6) It is preferable that a relative dielectric constant is as low as possible in order to lower parasitic capacitance at the cross area (overlap area) between upper and lower wiring layers. The relative dielectric constant is in a range from about 3 to about 3.5 in practical use. Assuming that the thickness of the interlayer insulating film is 2 µm, a parasitic capacitance per one pixel is several fF which is almost negligible.

If $SiN_x$ or $SiO_2$ grown by plasma CVD is used as the material of the interlayer insulating film, the relative dielectric constant is in a range from about 5 to about 9 and in a range from about 3.8 to about 4.5, respectively. A thickness of the interlayer insulating film capable of being deposited is in a range from about 300 nm to about 800 nm. A parasitic capacitance becomes therefore large.

If a thin resin film is used as the ,interlayer insulating film, a coupling capacitance between the pixel electrode and signal line and between adjacent pixel electrodes becomes small. The influence of crosstalk can be mitigated and the image quality can be improved.
(7) It is preferable that a heat resistance is 300° C. or lower when the heat resistance of Al wiring is taken into consideration.

As a process of forming a planarizing interlayer insulating film, a process similar to an ordinary photolithography step can be used. If the interlayer insulating film is formed by spin coating, the step coverage is good. In this case, an occurrence probability of display defects to be caused by an electrical short circuit between upper and lower wiring layers caused by small dusts of 1 µm or smaller in diameter, can be lowered.

Since the drain wiring in the peripheral circuit area is formed on the planarizing film, an occurrence probability of wire disconnection to be caused by steps lowers and the occurrence probability of product defects becomes very low.
(8) If the above-described process of forming the planarizing film is used, damages in the display area and peripheral circuit area to be caused by plasma CVD or sputtering can be reduced.

FIG. 12 and FIGS. 13A to 13C show a lateral electric field (in-plane switching (IPS) mode) type liquid crystal display according to another embodiment of the invention.

Figure 12:
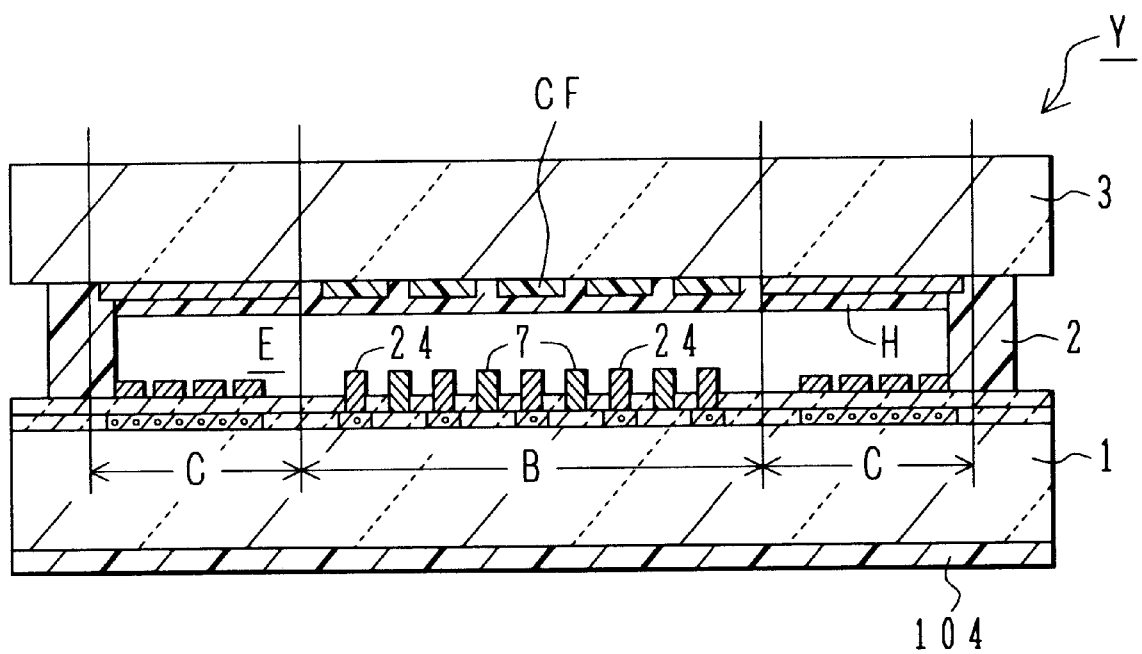
FIG. 12 is a schematic cross sectional view showing a lateral field effect type liquid crystal display according to a third embodiment of the invention.

As shown in FIG. 12, in a lateral electric field liquid crystal display Y, a first substrate 1 is formed with pixel electrodes 24 and common electrodes 7. A second substrate 3 is formed with color filters CF on which a planarizing film H is formed. A polarizing plate 104 is formed on the bottom of the first substrate 1.

As a predetermined voltage is applied across the pixel electrode 24 and common electrode 7, an electric field in parallel to the surface of the first substrate 1 (in a lateral direction) is generated in a liquid crystal material E.

FIGS. 13A to 13C show the details of the structure of the lateral electric field type liquid crystal display Y.

FIG. 13A is a plan view of the lateral electric field type liquid crystal display Y. FIG. 13B is a cross sectional view taken along line XVb–XVb' of FIG. 13A. FIG. 13C is a cross sectional view taken along line XVc–XVc' of FIG. 13A.

As shown in FIGS. 13A and 12B, a polysilicon layer 41a for a double-gate TFT having an island shape is formed on a first substrate 1.

A gate insulating film 5 is formed on the first substrate 1, covering the TFT polysilicon layer 41a. A scan line 15 extending in the row direction and functioning also as a pixel TFT gate electrode G and first signal lines 11a intermittently extending in the column direction are formed on the gate insulating film 5. An interlayer insulating film 17 is formed on the gate insulating film 5, covering the first signal lines and gate electrode G.

First and second openings 121a and 121b are formed through the interlayer insulating film 17. The first opening 121a is formed in the area corresponding to the first signal line 11a. The second opening 121b is formed in the area corresponding to the drain region D of the polysilicon layer 41a.

The first signal lines 11a and second signal lines 11b are connected via the opening 121a to form one signal line 11 continuous in the column direction. The drain region D of the polysilicon layer 41a and the pixel electrode 24 are connected via the opening 121b.

The common electrode 7 has: a first part 7a extending in the column direction and shared by a plurality of pixels 21 disposed in the column direction; branched parts 7b and 7c formed along the first signal line 11a; and connection parts 7d connecting the first part and branched parts. The first part 7a disposed in the central area is shared by a plurality of pixels 21 disposed in the column direction.

The branched parts 7b and 7c are formed on both sides of the first part 7a, and juxtaposed in the column direction in one pixel area. The connection part 7d extends in the row direction to connect the first part 7a and branch parts 7b and 7c.

The branch parts 7b and 7c are positioned over the signal lines 11a.

If the signal line 11 is made of only the wiring layer on the interlayer insulating film 17, it is necessary to form the common electrodes in different areas. The opening ratio therefore lowers.

As shown in FIG. 13C, both the common electrode 7 and pixel electrodes 24 are alternately formed on the interlayer insulating film 17 in the row direction.

In this active matrix type liquid crystal display, both the pixel electrode 24 and common electrode 7 are formed on the interlayer insulating film 17.

When a voltage is applied across the pixel electrode 24 and common electrode 7, an electric field is generated in the lateral direction and controls orientation of liquid crystal molecules. Leak of light from the ends of the pixel electrode 24 can be prevented.

More specifically, liquid crystal molecules of a lateral electric field mode liquid crystal display rotate in parallel with the horizontal plane. If a lateral electric field does not exist, light will not transmit and black color is displayed. If a lateral electric field exists, light will transmit and white color is displayed. Since liquid crystal molecules rotate in parallel with the horizontal plane, it is preferable that the pixel electrode 24 and common electrode 7 are disposed on the same plane. If the pixel electrode 24 and common electrode 7 are not disposed on the same plane, an electric field is generated in the vertical direction because of a step between the edge area of the pixel electrode 24 and common electrode 7. A vertical electric field may cause light leak and irregular transmission factors which may cause display defects.

These problems will not occur in the case of the liquid crystal display of this embodiment.

Since the first signal line 11a is shielded by the common electrode 7, it is possible to prevent a display image from being disturbed by leakage of an electric field from the first signal line 11a. An image having a high quality can be displayed.

Since a single interlayer insulating film is used, the processes of forming the pixel area can be simplified.

An area of the pixel TFT 25 and the like excepting the pixel electrode 24 is shielded by the pixel electrode 24 and common electrode 7. By forming a stripe BM structure (FIG. 15A) on the opposing substrate 3, a variation in the opening ratio among lots to be caused when the first and second substrates 1 and 3 are bonded can be suppressed.

Next, the specific structure and operation of an active matrix type liquid crystal display will be described. As the active matrix type liquid crystal display, the liquid crystal display of the embodiment described above is used.

Figure 14:
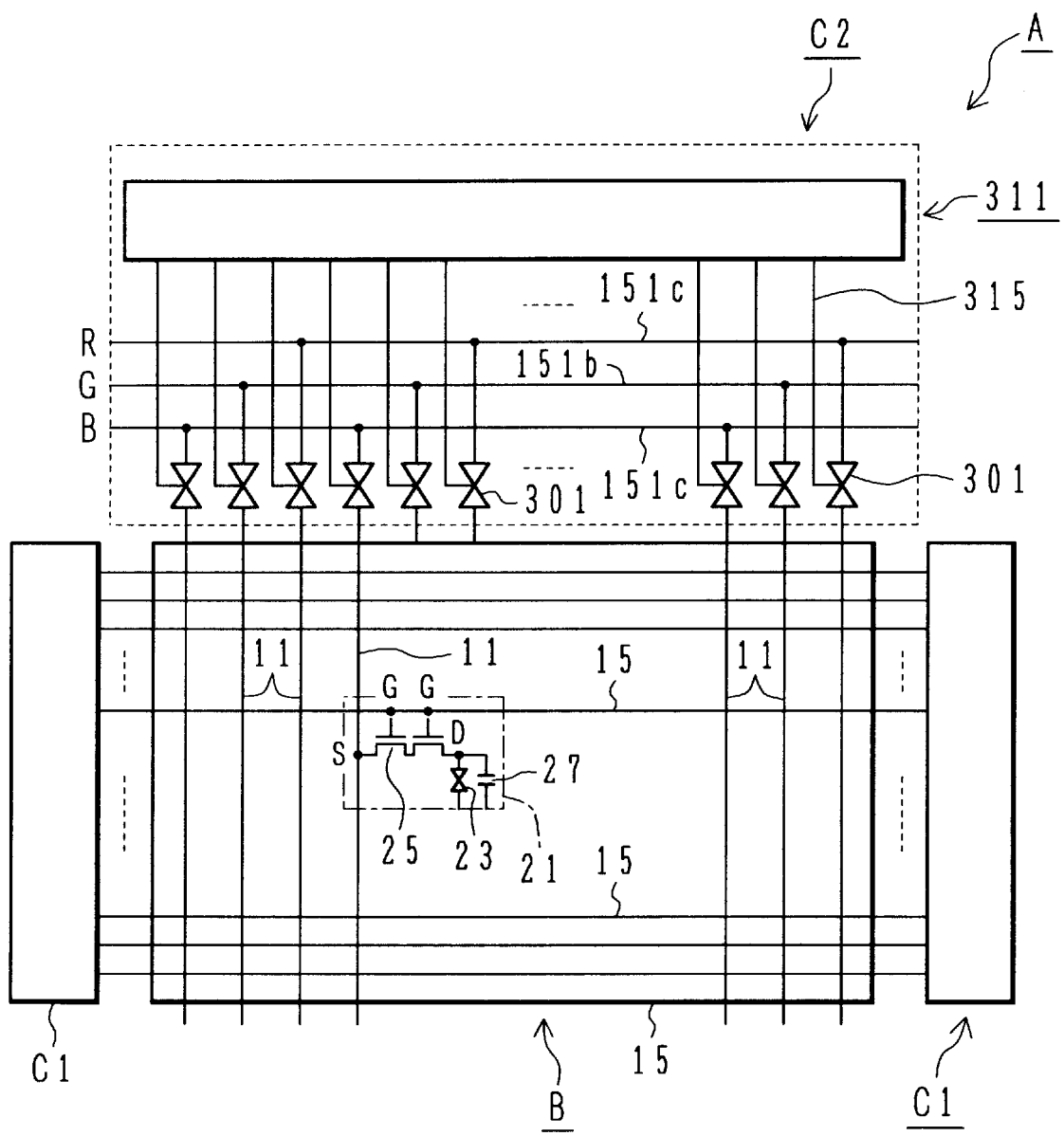
FIG. 14 is a circuit diagram showing the outline structure of a liquid crystal display.

FIG. 14 is a circuit diagram of a peripheral circuit integrated liquid crystal display. In FIG. 14, an example of the signal line driver C2 shown in FIG. 2 is shown.

This driver performs dot sequential driving.

The peripheral circuit integrated liquid crystal display A has a display area B and a peripheral circuit area C.

In the display area B, a number of signal lines 11, 11, 11, . . . extend in the column direction. Three video signal lines 151a, 151b and 151c transfer color image data of RGB or the like.

The color image data is transferred via an analog switch 301 to the signal line 11. Three analog switches are turned on at the same time for three video signal lines to transfer a set of RGB signals. Next, three adjacent three analog switches are turned on to transfer the next set of RGB signals. After image data of one scan line is displayed, the next scan line is selected.

As shown in FIG. 14, the signal line driver C2 has analog switches 301, an analog switch controller 311 for controlling the analog switches 301, and analog switch control signal lines 315 for connecting the analog switches 301 and analog switch controller 311.

A video signal supplied from a video signal generator is transferred via the video signal line 151 to the analog switch 301. The analog switch controller 311 controls the analog switch 301 to control the video signal to be transferred to the source electrode S of the pixel TFT 25.

In this manner, the dot sequential driving is performed.

In the display area B, a number of scan lines 15, 15, 15, . . . extend in the row direction, crossing the signal lines 11. A pixel 21 is disposed at each cross point between the signal line and scan line. In the display area B, pixels 21 are disposed in a matrix shape, the total number of pixels being the number of signal lines multiplied by the number of scan lines.

Each display unit constituted of three pixels can display three colors of RGB.

The structure of the peripheral circuit area C will be described. As described earlier, the peripheral circuit area C includes the scan line driver C1 and signal line driver C2.

Figure 15A:
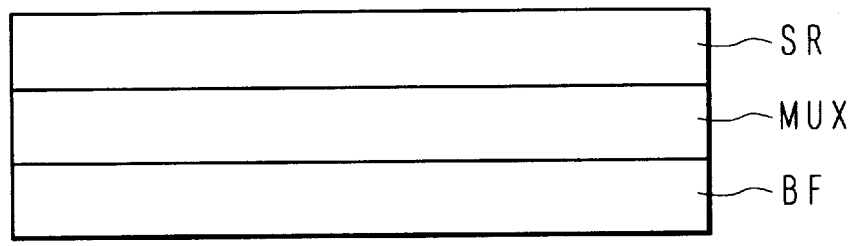
FIG. 15A is a diagram showing a scan line driver in the peripheral circuit of a liquid crystal display.
Figure 15B:
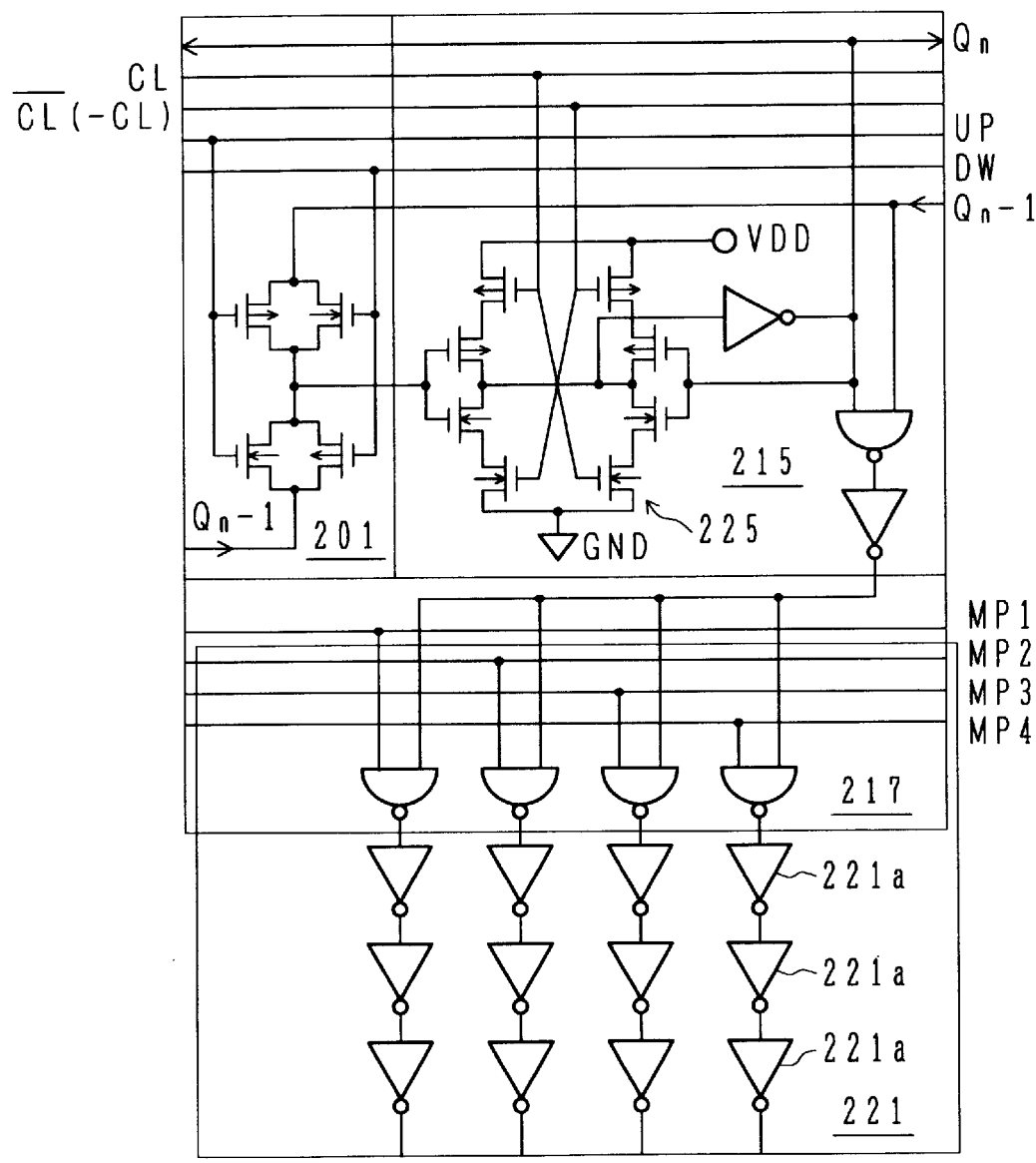
FIG. 15B is a detailed circuit diagram thereof.

FIGS. 15A and 15B show the scan line driver C1 of a multi-stage configuration. FIG. 15A is a block diagram showing the scan line driver C1 and FIG. 15B is a circuit diagram showing one stage of the scan line driver.

As shown in FIG. 15A, the scan line driver C1 has a shift register SR, a multiplexer MUX, and a buffer BF for buffering outputs of the multiplexer MUX. The scan line driver C1 supplies signals to scan lines to sequentially select them.

As shown in FIG. 15B, the scan line driver of one stage includes: a two-way switch unit 201 for switching between scan directions; a shift register unit 215 for generating scan signals; a multiplexer unit 217 for determining scan signal timings; and an output buffer unit 221 including three-stage serial inverters 221a to increase a driving capacity.

The source voltages of a flip-flop circuit 225 in the shift register unit 215 are represented by VDD and GND. An output of the flip-flop circuit 225 is supplied via a NAND gate and an inverter to the multiplexer unit 217.

In the multiplexer unit 217, a signal supplied from the flip-flop circuit 225 is branched to four output signal lines. Four branched output signals are subjected to AND operation with multiplexing signals MP1 to MP4, and thereafter are supplied to the output buffer unit 221.

The output buffer units 221 increase the load driving capability of the four signals MP1 to MP4 supplied from the multiplexer unit 217 and output them. The output buffer unit 221 has four output terminals. Each output terminal of the output buffer is connected via the scan line to the gates G of pixel TFTs 25 in the display area B.

The operation of the scan line driver C1 will be described. The scan line driver C1 sequentially scans the scan lines 15 synchronously with a clock signal CL or its inverted clock signal –CL. All pixel TFTs 25 connected to each scan line are temporarily turned on at the same time. Since each line is sequentially scanned, the number of scan line driving signals is, for example, 600 per one frame. The shift register unit 215 generates 150 signals per one frame before multiplexing. The clock signal CL and its inverted clock signal –CL of the shift resister unit 215 of the scan line driver C1 have a pulse frequency in a range from 40 kHz to 60 kHz.

The structure of the signal line driver C2 will be described with reference to FIGS. 16A and 16B and FIGS. 17A and 17B.

Figure 16A:
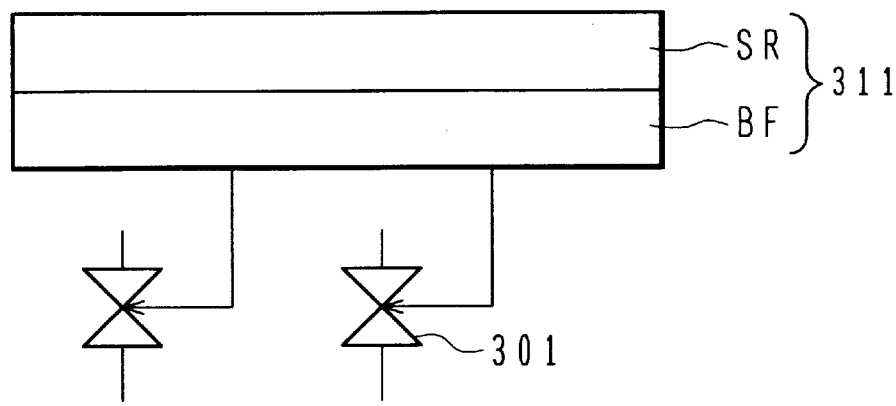
FIG. 16A is a diagram showing a signal line driver in the peripheral circuit of the liquid crystal display.
Figure 16B:
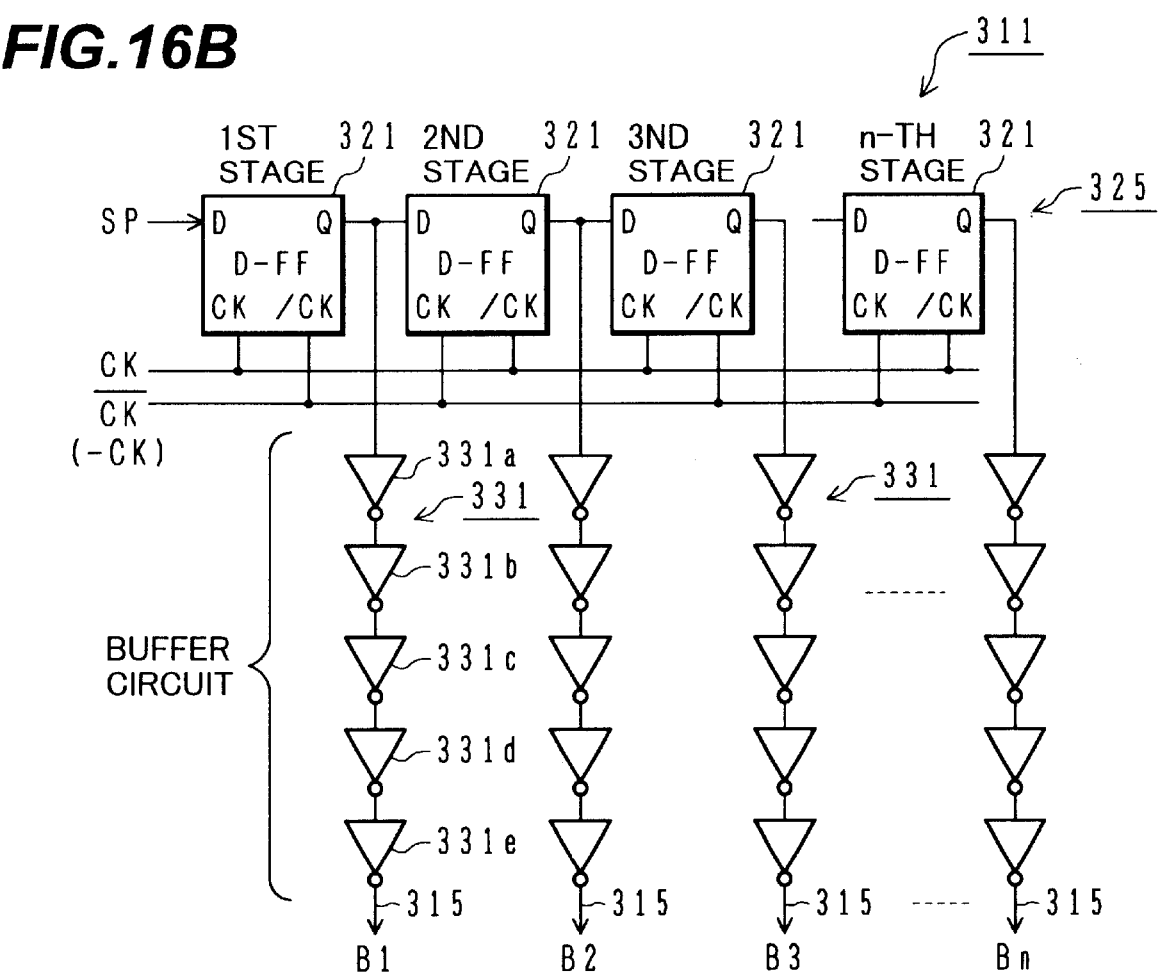
FIG. 16B is a detailed circuit diagram thereof.

FIG. 16A is a block diagram showing the signal line driver C2 and FIG. 16B is a circuit diagram showing the structure of an analog switch controller 311.

As shown in FIG. 16A, the signal line driver C2 has an analog switch controller 311 constituted of a shift register circuit SR and a buffer circuit BF, and analog switches 301 which are turned on and off in response to outputs from the buffer circuit BF.

FIG. 16B is a circuit diagram of the shift register SR and buffer circuit BF. The shift register circuit 325 is constituted of serially connected multi-stage flip-flop circuits 321, 321, 321, . . . Outputs of the flip-flop circuits 321 of the shift register circuit 325 are supplied to the buffer circuit 331. Analog switch control signal lines 315 connect the outputs of the buffer circuit and the control electrodes of the analog switches.

A clock signal CK and its inverted clock signal –CK common for each stage are input to clock terminals of all flip-flop circuits 321 of the multi-stage. An SP signal is applied to the input terminal of the first stage flip-flop circuit 321 among the multi-stage flip-flop circuits. An output signal from the output terminal Q of the first stage flip-flop circuit of the shift register circuit 325 is supplied to a first stage buffer circuit 331.

The output Q of the first stage flip-flop circuit 321 is input to the input terminal D of the next (second) stage flip-flop circuit 321. An output of the second stage flip-flop circuit 321 is supplied to a second stage buffer circuit 331. Similarly, an output of each flip-flop circuit 321 is input to the next stage flip-flop circuit 321 and supplied to a corresponding stage output buffer circuit 331.

The buffer circuit 331 includes five-stage serial inverters 331a to 331e.

Figure 17A:
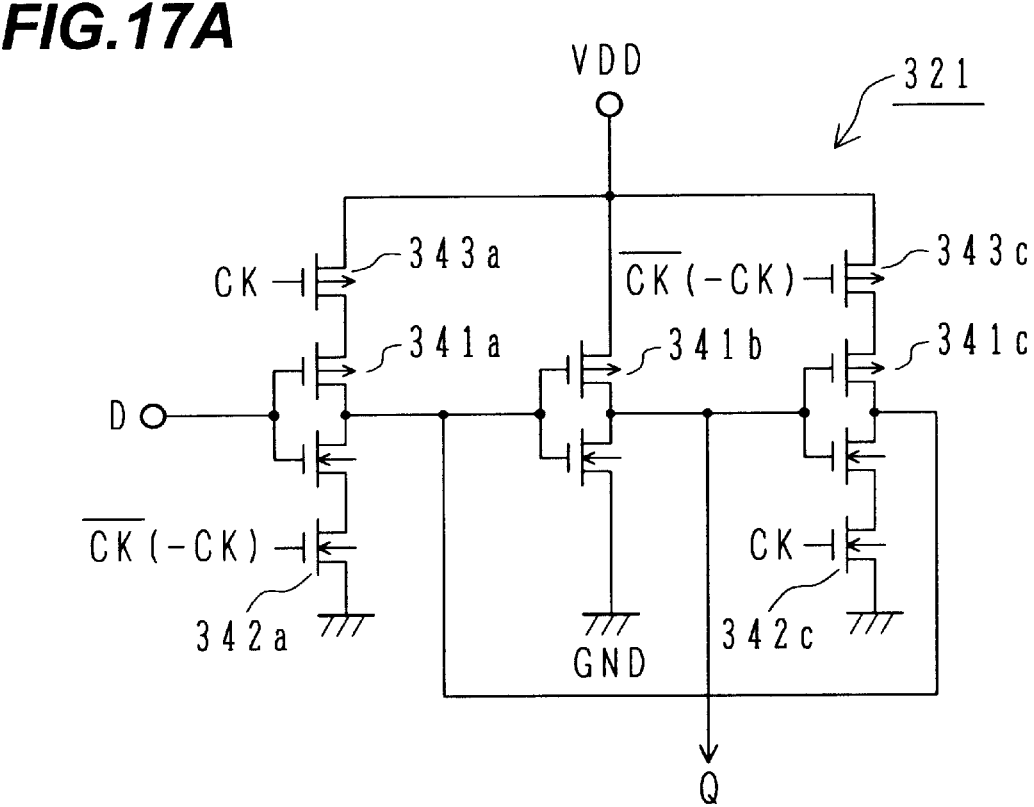
FIG. 17A is a flip-flop circuit diagram and FIG. 17B is an inverter circuit diagram, respectively of a signal driver of a liquid crystal display.
Figure 17B:
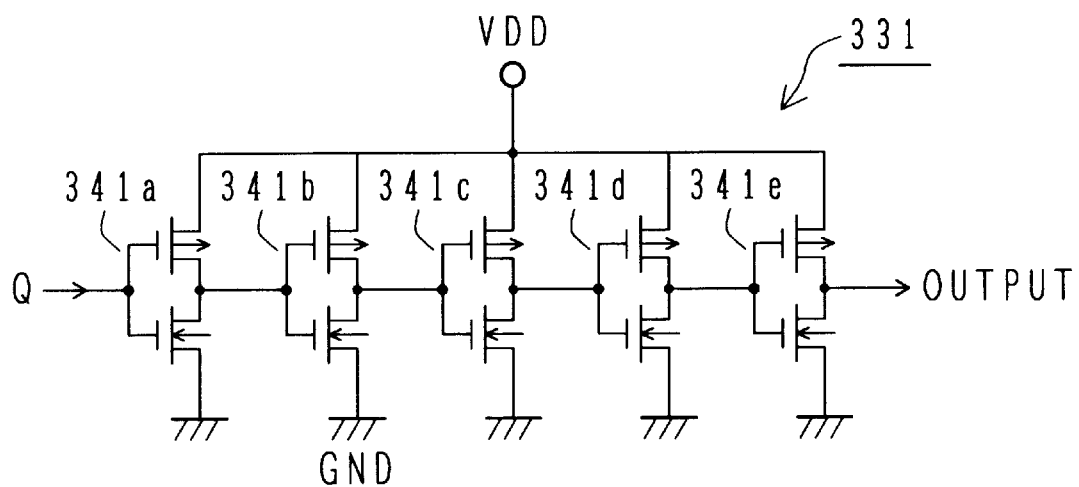

FIG. 17A is a circuit diagram of one-stage flip-flop circuit 321 constituting the shift register circuit, and FIG. 17B is a circuit diagram of the buffer circuit 331.

The flip-flop circuit 321 includes serially connected three-stage CMOS circuits 341a, 341b and 341c. Source voltages are represented by VDD and GND. The first stage and third stage CMOS circuits 341a and 341c are clocked inverters.

An input to the first stage CMOS circuit 341a is supplied to the input terminal D of the shift register circuit 325. The second stage CMOS circuit 341b is an inverter and is input with an output of the first stage CMOS circuit 341a. An output of the second stage CMOS circuit 341b is input to the third stage clocked inverter.

FIG. 17B shows the details of the buffer circuit 331.

The buffer circuit 331 includes serially connected five-stage CMOS inverters 341a to 341e. An output Q of the flip-flop circuit is input to the buffer circuit 331.

As a signal is input to the input terminal D of the flip-flop circuit, an output signal Q is output in response to the clock signal CK or its inverted clock signal –CK.

An output Q of the flip-flop circuit 321 at each stage (FIGS. 16B) controls the corresponding analog switch (FIG. 14) via the output buffer circuit. An output Q of the flip-flop circuit (FIG. 16B) is supplied to the next stage flip-flop circuit.

The operation of the active matrix type liquid crystal display will be described.

When the scan line driver C1 selects one scan line 15 and all pixel FETs 25 whose gates are connected to the selected scan line 15 are turned on, the analog switch 301 is controlled by an analog switch control signal output from the output buffer 331 connected to the first stage flip-flop circuit 321 of the shift register circuit.

When the analog switch 301 is turned on, each pixel cell (liquid crystal cell 23 and storage capacitor 27) is charged to write image data, in accordance with the contents of a display signal on each of the video signal lines 151a (R), 151b (G) and 151c (B) supplied via the pixel TFT 25 already turned on by the signal supplied from the scan line 15.

The shift register circuit 321 sequentially outputs a control signal to the first stage to the n-th stage to sequentially turn on a plurality of analog switches 301. The video signals (display signal) on the video signal lines 151 are distributed to pixels corresponding to each stage flip-flop circuit 321 of the shift register circuit.

When the scan line driver C1 selects the next scan line 15, the pixel TFTs 25 previously selected are turned off and the liquid crystal cell 23 and storage capacitor 27 are electrically disconnected from the signal line 11. The supplied image data is maintained during the one horizontal period while the scan lines 15 are sequentially scanned.

The operation described above is repeated to display an image.

The operation speed of the shift register of the signal line driver C2 is about 4.88 MHz which is faster than the shift register of the scan line driver C1.

Figure 18:
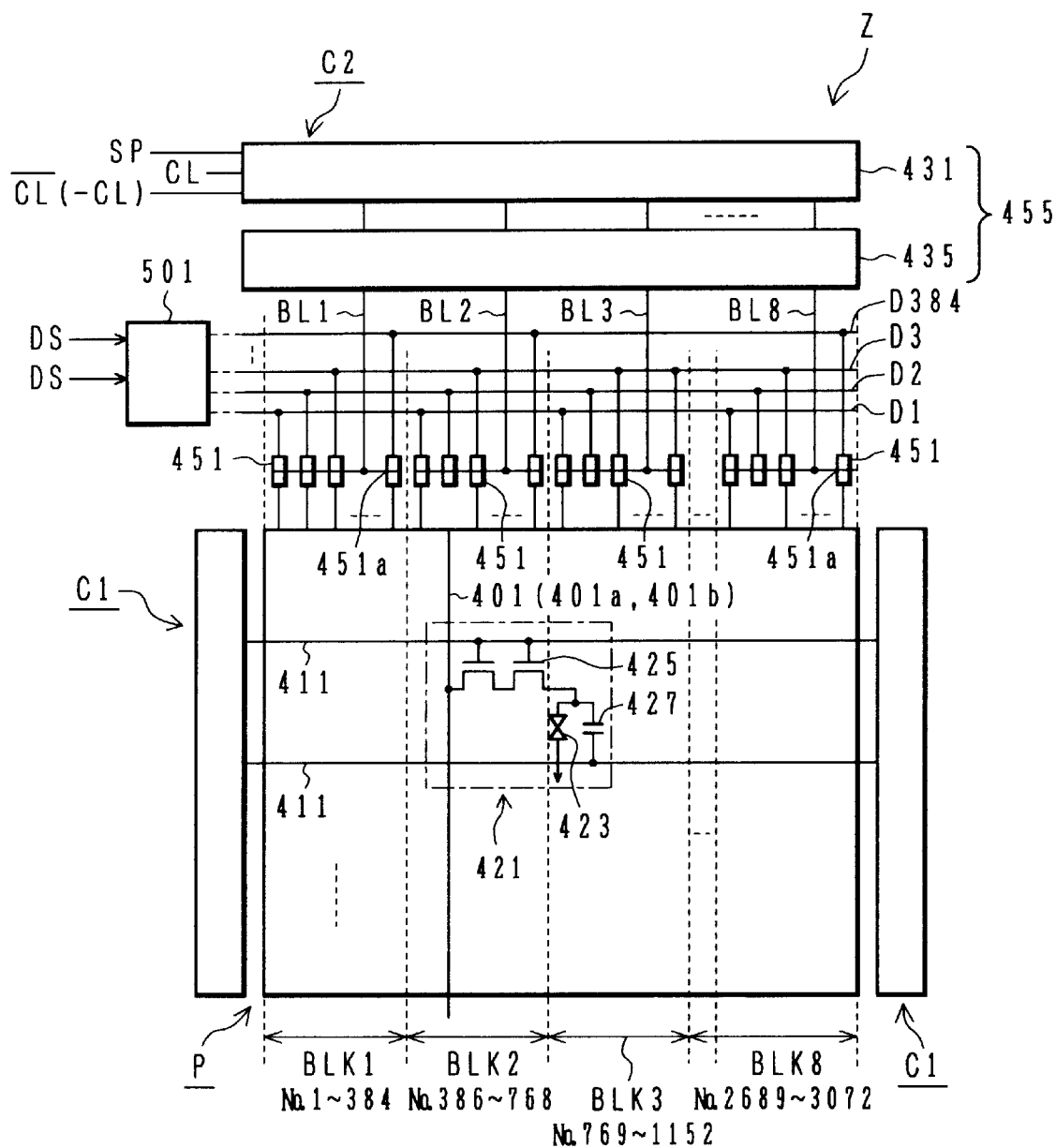
FIG. 18 is a circuit diagram illustrating a block line sequential driving method.

FIG. 18 shows an equivalent circuit of a peripheral circuit integrated active matrix type liquid crystal display Z of a block sequential driving type. It is preferable that as this liquid crystal display, the liquid crystal display of the first to third embodiments is used.

The format of pixels of the liquid crystal panel P of this liquid crystal display Z shown by the equivalent circuit is XGA (pixels=1024×RGB×768).

The liquid panel P includes signal lines 401 extending in the column direction in the display area B, scan lines 411 extending in the row directions, and pixels 421 disposed cross points between the signal lines 401 and scan lines 411.

As described in the first to third embodiments, the signal line 401 includes a first signal line 401a formed at the same level as the scan line 411 and a second signal line 401b formed at the second level on the interlayer insulating film. Each pixel uses a double-gate TFT. A single-gate TFT or a multi-gate TFT may also be used.

Each pixel 421 includes a double-gate pixel TFT 425, a liquid crystal cell 423, and a storage capacitor 427 connected to the scan line of an adjacent pixel 421.

A peripheral circuit area C is formed around the display area B of a laterally elongated rectangle shape. The peripheral circuit area C includes a scan line driver C1 and a signal line driver C2.

The scan line driver C1 is disposed to the left of the display area, and the signal line driver C2 is disposed in an area above the display area B.

The display area B is divided into eight blocks including a first block BLK1 to an eighth block BLK8. The total number of scan lines extending in the row direction in the display area B is 3072 (384×8 blocks).

Of the signal lines, 3072 lines in total, the first to 384-th lines are assigned to the first block BLK1, and the 385-th to 768-th lines are assigned to he second block BLK2. In this manner, the signal lines are assigned to the first to eighth blocks BLK1 to BLK8. An external driver LSI 501 has signal processing circuits such as a D/A converter and a level converter.

A digital signal DS is supplied from an information processing apparatus or the like to the line sequential type external driver LSI 501. Analog gradation signals are supplied to 384 common signal lines D1 to D384.

The common signal lines D1 to D384 are connected to the sources S of a plurality of pixel TFTs 425 disposed in the column direction in the display area B divided into the first to eighth blocks.

Between the common signal lines (D1 to D384) and the sources S, CMOS type TFT analog switches 451 corresponding in number to the number of common signal lines are disposed.

The control terminals 451a of the CMOS TFT analog switches 451 corresponding to the first to eighth blocks BLK1 to BLK8 are used in common for each block. Control signal lines BL1 to BL8 for transferring outputs from the analog switch controller 455 are connected to the control terminals 451a of the CMOS TFT analog switches 451 commonly used for each block.

All the CMOS TFT analog switches 451 of the blocks BLK1 to BLK8 are controlled by the analog switch controller 455.

The analog switch controller 455 includes a shift register circuit 431 and a buffer circuit 435.

For example, the shift register circuit 431 is made of an eight-stage shift register circuit, and the buffer circuit 435 is made of a serially connected eight-stage inverter circuit.

An output of the shift register of each stage is input to the serially connected inverter circuit of the buffer circuit 435 of the corresponding stage. An output signal of this serially connected inverter circuit is supplied to the control terminals 451a of the CMOS TFT analog switches 451 used in common for each block.

The operation of the active matrix type liquid crystal display of the block sequential driving type will be described with reference to the timing charts of FIGS. 19A to 19F.

Figure 19:
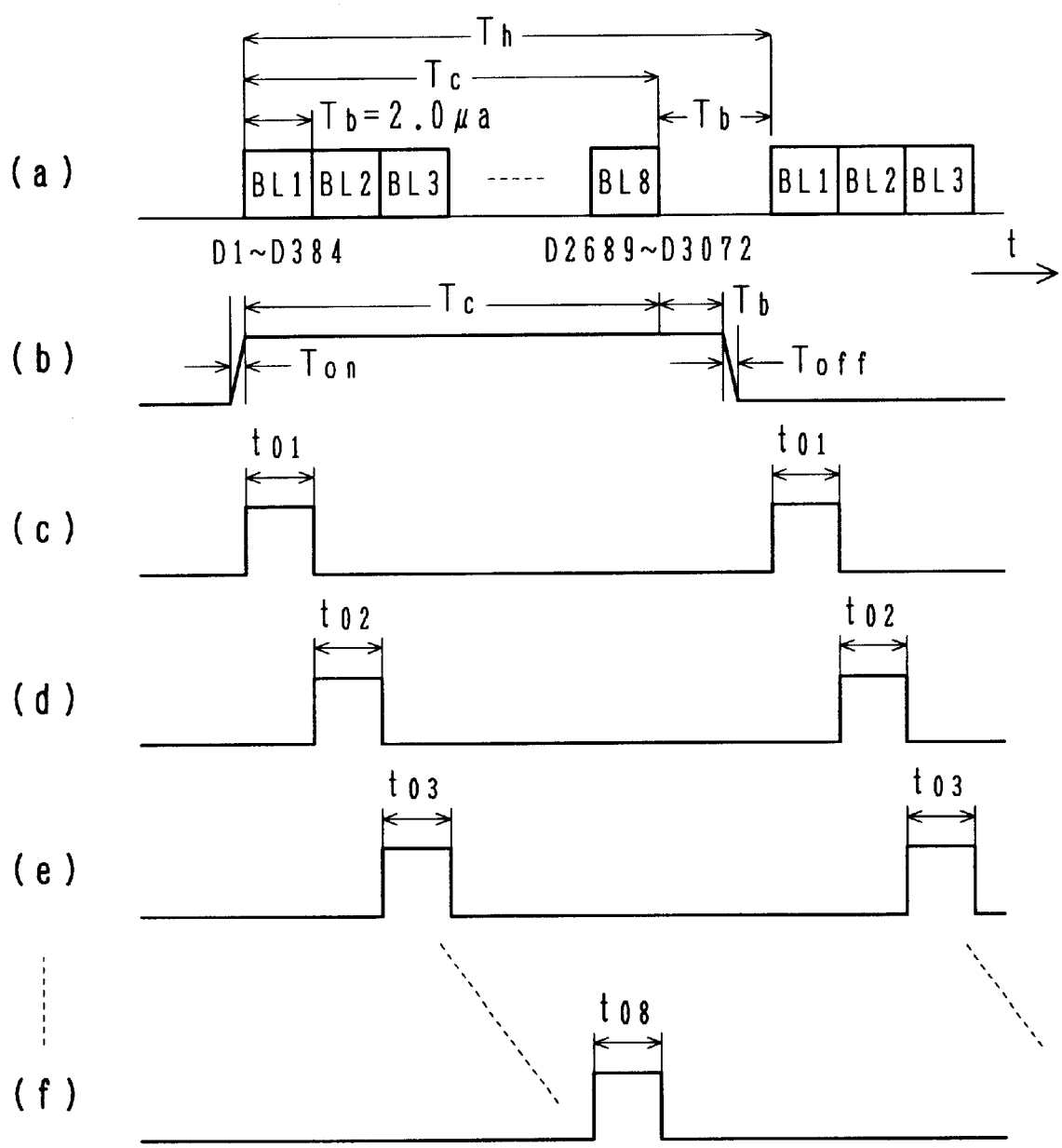
FIGS. 19A to 19F are timing charts illustrating the operation of a block line sequential driving method.

As shown in FIG. 19A, one horizontal period Th (20 µs) is divided into a write period Tc (from BL1 to BL8) and a blanking period Tb. As shown in FIG. 19B, the rise timing of a gate scan signal is represented by Ton and the fall timing thereof is represented by Toff.

As shown in Figs., during one horizontal period Th and during the period Tc while the gate scan signal is on, an on-signal is sequentially supplied to each of the first to eighth blocks during the period from $t_{01}$ to $t_{08}$.

A display signal is written in pixel cells in each block in the one row unit basis. A display signal is written collectively for pixel cells in each block. The similar operation is repeated for pixels of the next row to write the display signal into pixels of each row in the block sequential manner.

By using a block sequential driver, signal lines can be driven collectively for each block. As compared to a dot sequential driving method, the circuit structure can be simplified. Since pixels in one block can be operated by one pulse, the performance requirements for the shift register of the signal line driver C2 can be mitigated.

Figure 20:
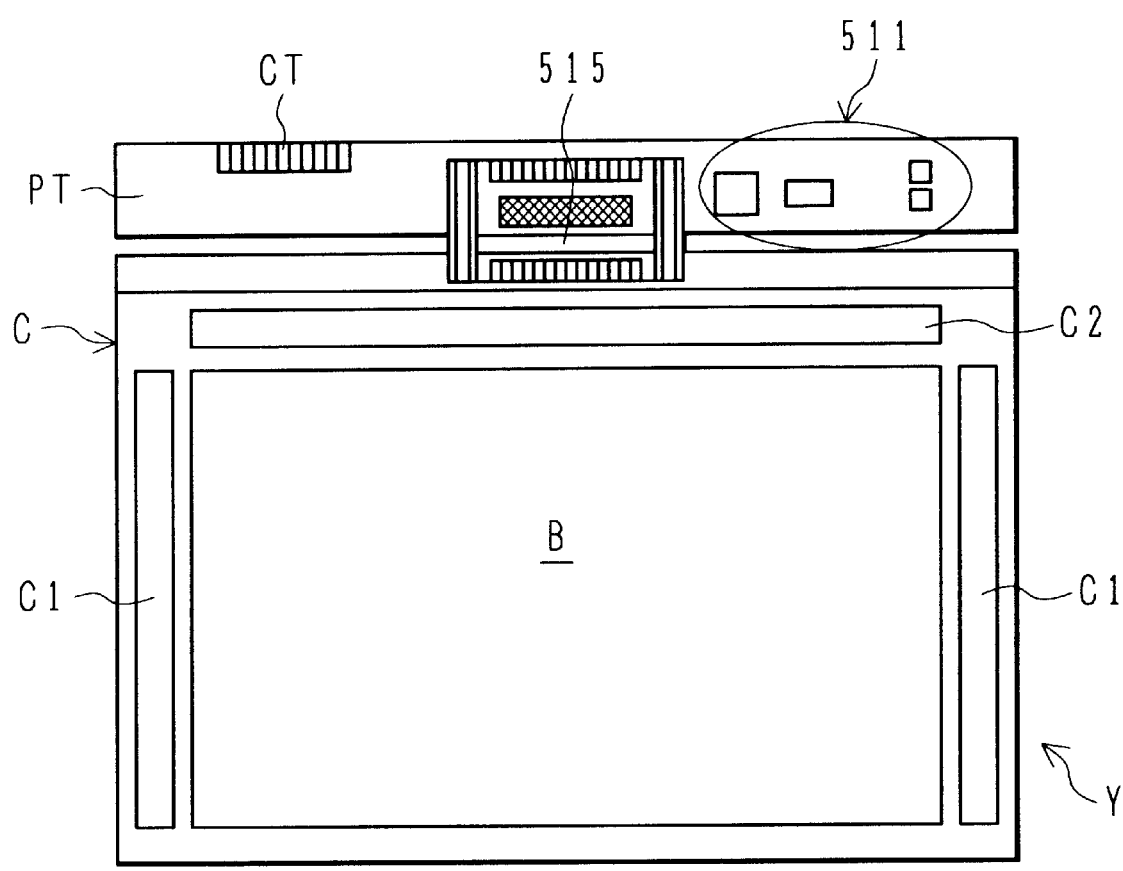
FIG. 20 is a schematic diagram of an active matrix type liquid crystal display with a control circuit.

FIG. 20 shows another example of an active matrix type liquid crystal display. This display is applicable to the active matrix type liquid crystal display described above.

A liquid crystal display Y having a display area A and a peripheral circuit area C is connected via a TAB-IC 515 to a printed circuit board PT mounted with a connector CT, a control integrated circuit 511 and the like.

By using the active matrix type liquid crystal display of this structure, the control integrated circuit 511 and the like necessary for high speed operation can be mounted on the printed circuit board PT.

If high speed CMOS FETs formed on a single crystal silicon substrate are used as semiconductor active elements, a high speed integrated circuit can be formed. This integrated circuit is mounted on the printed circuit board PT.

As compared to TFT using an amorphous silicon layer or a polysilicon layer as a channel layer, CMOS FETs formed on a single crystal substrate can operate at high speed. By using high speed integrated circuits and control circuits, a high speed operation is possible.

The liquid crystal display of this invention is suitable for use as a display of a personal computer, a portable communications apparatus, a television, a factory monitor, or the like.

The present invention has been described in connection with the preferred embodiments. The invention is not limited only to the above embodiments. It is apparent that various modifications, improvements, combinations, and the like can be made by those skilled in the art.

What is claimed is:

1. A liquid crystal display having an active matrix substrate with thin film transistors comprising:

a first substrate;

a plurality of scan lines formed on said first substrate and extending in a row direction;

a plurality of first signal lines formed on said first substrate and intermittently extending in a column direction in areas excepting neighborhoods of said scan lines;

an interlayer insulating film covering said scan lines and said first signal lines;

a plurality of first openings formed through said interlayer insulating film, said first openings exposing said first signal lines;

a plurality of second signal lines formed on said interlayer insulating film, said second signal lines being connected via said first openings to said first signal lines to form signal lines continuous in the column direction;

pixel electrodes formed on said interlayer insulating film; and thin film transistors each disposed near a cross area between said scan line and said signal line, said thin film transistors including a plurality of island-shaped TFT polysilicon layers as a channel layer; a gate insulating film formed on said first substrate, said gate insulating film covering said TFT polysilicon layers, a gate electrode connected to and made of a same layer as said scan line, a source electrode connected to said signal line, and a drain electrode connected to said pixel electrode wherein the source electrode of said thin film transistor is connected to said second signal line via an opening including said first opening, and formed continuously through said interlayer insulating film and said gate insulating film.

2. A liquid crystal display according to claim 1, further comprising:
   a second substrate disposed opposing said first substrate;
   a common electrode formed on said second substrate; and
   a liquid crystal layer sandwiched between said first and second substrates.

3. A liquid crystal display according to claim 1, wherein said pixel electrode and said second signal line are made of a same material.

4. A liquid crystal display according to claim 1, wherein said second signal line is electrically connected via a plurality of said first openings to at least three of said first signal lines adjacent in the column direction, and disposed in parallel with said first signal lines.

5. A liquid crystal display according to claim 2, further comprising an opposing light shielding film formed on said second substrate, said opposing light shielding film occupying an area inclusive of an imaginary projection of said second signal line in a direction normal to said first substrate and reaching imaginary projections of adjacent pixel electrodes.

6. A liquid crystal display according to claim 1, wherein said scan line for a pixel electrode adjacent to one pixel electrode in the column direction includes a prominent portion projecting under said one pixel electrode.

7. A liquid crystal display according to claim 6, further comprising:
   a storage capacitor polysilicon layer formed in an area including the prominent portion on said first substrate;
   a gate insulating film formed on said storage capacitor polysilicon layer; and
   a second opening formed through said gate insulating film and said interlayer insulating film above said storage capacitor polysilicon layer,
   wherein said pixel electrode of the one pixel is connected via said second opening to said storage capacitor polysilicon layer.

8. A liquid crystal display according to claim 1, further comprising:
   a first peripheral circuit disposed in a peripheral area of said first substrate in the row direction, said first peripheral circuit including a scan line driver circuit including semiconductor active elements for driving said scan lines; and
   a second peripheral circuit disposed in a peripheral area of said first substrate in the column direction, said second peripheral circuit including a signal line driver circuit including semiconductor active elements for driving said signal lines.

9. A liquid crystal display having an active matrix substrate with thin film transistors comprising:
   a first substrate:
   a plurality of scan lines formed on said first substrate and extending in a row direction;
   a plurality of first signal lines formed on said first substrate and intermittently extending in a column direction in areas excepting neighborhoods of said scan lines;
   an interlayer insulating film covering said scan lines and said first signal lines;
   a plurality of first openings formed through said interlayer insulating film, said first openings exposing said first signal lines;
   a plurality of second signal lines formed on said interlayer insulating film, said second signal lines being connected via said first openings to said first signal lines to form signal lines continuous in the column direction;
   pixel electrodes formed on said interlayer insulating film and having an extension portion in the column direction in each pixel area; and
   a common electrode formed on said interlayer insulating film in an area adjacent to each of said pixel electrodes, said common electrode having a portion extending in an area of a plurality of pixels; wherein said common electrode comprises:
      a first part extending in a plurality of pixel areas disposed in the column direction;
      branched parts formed in parallel with said first part and sandwiching said pixel electrodes; and
      connection parts for connecting said first part and said branched parts; wherein said branched parts are formed above said first signal lines.

10. A liquid crystal display having an active matrix substrate with thin film transistors, comprising:
   a first substrate;
   a plurality of scan lines formed on said first substrate and extending in a row direction;
   a plurality of first signal lines formed on said first substrate and intermittently extending in a column direction in areas excepting neighborhoods of said scan lines;
   an interlayer insulating film comprising a resin layer, covering said scan lines and said first signal lines;
   a plurality of first openings formed through said interlayer insulating film, said first openings exposing said first signal lines;
   a plurality of second signal lines formed on said interlayer insulating film, said second signal lines being connected via said first openings to said first signal lines to form signal lines continuous in the column direction;
   pixel electrodes formed on said interlayer insulating film and having an extension portion in the column direction in each pixel area;
   a common electrode formed on said interlayer insulating film in an area adjacent to each of said pixel electrodes, said common electrode having a portion extending in an area of a plurality of pixels;
   wherein said common electrode comprises:
      a first part extending in a plurality of pixel areas disposed in the column direction;
      branched parts formed in parallel with said first part and sandwiching said pixel electrode; and
      connection parts for connecting said first part and said branched parts;
      wherein said branched parts are formed above said first signal lines.

11. A liquid crystal display having an active matrix substrate, comprising:
   a first substrate;
   a plurality of island-shaped TFT polysilicon layers disposed in row and column directions on said first substrate in a matrix shape;

a gate insulating film formed on said first substrate, said gate insulating film covering said polysilicon layers;

a plurality of scan lines formed on said gate insulating film, extending in the row direction, and crossing said polysilicon layers;

a plurality of first signal lines formed on said gate insulating film and intermittently extending in the column direction in areas excepting neighborhoods of said scan lines;

an interlayer insulating film comprising a resin layer, covering said scan lines and said first signal lines;

a plurality of first openings formed hugh said interlayer insulating film, said first openings exposing said first signal lines;

a plurality of second signal lines formed on said interlayer insulating film, said second signal lines being connected via said first openings to said first signal lines to form signal lines continuous in tie column direction;

pixel electrodes formed on said interlayer insulating film and having an extension portion in the column direction in each pixel area;

a common electrode formed on said interlayer insulating film in an area adjacent to each of said pixel electrodes, said common electrode partially overlapping said scan lines and said first signal lines and having a portion extending in an area of a plurality of pixels; and thin film transistors each disposed near a cross area between said scan line and said signal line, said thin film transistor including said TFT polysilicon layer as a channel layer, a gate electrode formed by said scan line or connected to said scan line, a source electrode connected to said signal line, and a drain electrode connected to said pixel electrode.

12. A liquid crystal display having an active matrix substrate with thin film transistors, comprising:

a first substrate;

a plurality of scan lines formed on said first substrate and extending in a row direction;

a plurality of first signal lines formed on said first substrate and intermittently extending in a column direction in areas excepting neighborhoods of said scan lines;

an interlayer insulating film comprising a resin layer, covering said scan lines and said first signal lines;

a plurality of first openings formed through said interlayer insulating film, said first openings exposing said first signal lines;

a plurality of second signal lines formed on said interlayer insulating film, said second signal lines being connected via said first openings to said first signal lines to form signal lines continuous in the column direction;

a second substrate disposed opposing said first substrate;

a common electrode formed on said second substrate;

a liquid crystal layer sandwiched between said first and second substrates;

pixel electrodes formed on said interlayer insulating film;

thin film transistors each disposed near a cross area between said scan line and said signal line, said thin film transistors including a plurality of island-shaped TFT polysilicon layers as a channel layer; a gate insulating film formed on said first substrate, said gate insulating film covering said TFT polysilicon layers, a gate electrode connected to said scan line, a source electrode connected to said signal line, and a drain electrode connected to said pixel electrode;

wherein said second signal line is electrically connected via a plurality of first openings to at least three of said first signal lines adjacent in the column direction, and disposed in parallel with said first signal lines.

13. A liquid crystal display having an active matrix substrate with thin film transistors, comprising:

a first substrate;

a plurality of scan lines formed on said first substrate and extending in a row direction;

a plurality of first signal lines formed on said first substrate and intermittently extending in a column direction in areas excepting neighborhoods of said scan lines;

an interlayer insulating film comprising a resin layer, covering said scan lines and said first signal lines;

a plurality of first openings formed through said interlayer insulating film, said first openings exposing said first signal lines;

a plurality of second signal lines formed on said interlayer insulating film, said second signal lines being connected via said first openings to said first signal lines to form signal lines continuous in the column direction;

a second substrate disposed opposing said first substrate;

a common electrode formed on said second substrate;

a liquid crystal layer sandwiched between said first and second substrates;

pixel electrodes formed on said interlayer insulating film;

thin film transistors each disposed near a cross area between said scan line and said signal line, said thin film transistors including a plurality of island-shaped TFT polysilicon layers as a channel layer; a gate insulating film formed on said first substrate, said gate insulating film covering said TFT polysilicon layers, a gate electrode connected to said scan line, a source electrode connected to said signal line, and a drain electrode connected to said pixel electrode;

wherein the source electrode of said thin film transistor and said first signal line are connected to said second signal line via an opening formed continuously through said interlayer insulating film and said gate insulating film.

* * * * *

UNITED STATES PATENT AND TRADEMARK OFFICE
CERTIFICATE OF CORRECTION

PATENT NO.    : 6,633,359 B1
DATED         : October 14, 2003
INVENTOR(S)   : Zhang et al.

It is certified that error appears in the above-identified patent and that said Letters Patent is hereby corrected as shown below:

<u>Column 23,</u>
Line 12, replace "hugh" with -- through --.
Line 18, replace "tie" with -- the --.

Signed and Sealed this

Eleventh Day of May, 2004

JON W. DUDAS
*Acting Director of the United States Patent and Trademark Office*